United States Patent
Takahashi et al.

(10) Patent No.: US 9,451,677 B2
(45) Date of Patent: Sep. 20, 2016

(54) DISPLAY APPARATUS, DISPLAY METHOD, AND PROGRAM

(71) Applicant: SAMSUNG DISPLAY CO., LTD., Yongin-si, Gyeonggi-do (KR)

(72) Inventors: Seiki Takahashi, Yokohama (JP); Takeshi Okuno, Yokohama (JP); Eiji Kanda, Yokohama (JP)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/961,777

(22) Filed: Dec. 7, 2015

(65) Prior Publication Data

US 2016/0165700 A1    Jun. 9, 2016

(30) Foreign Application Priority Data

Dec. 8, 2014  (JP) .................. 2014-247998

(51) Int. Cl.
*H05B 37/02* (2006.01)
*H05B 33/08* (2006.01)

(52) U.S. Cl.
CPC ...... *H05B 37/0227* (2013.01); *H05B 33/0896* (2013.01)

(58) Field of Classification Search
CPC .................................................... G09G 3/36
USPC ...... 257/82, 83, 84, 458; 345/204, 205, 206, 345/207, 690, 36, 38–39, 45–46, 52
See application file for complete search history.

(56) References Cited

U.S. PATENT DOCUMENTS

2008/0079001 A1* 4/2008 Umezaki ............ H01L 27/1214
257/59
2010/0156955 A1* 6/2010 Kimura ................ G09G 3/3426
345/690
2013/0120331 A1* 5/2013 Yamamoto ............ G06F 3/0412
345/207

FOREIGN PATENT DOCUMENTS

JP    2001-524090 A    11/2001
JP    2006-506307 A    2/2006

(Continued)

OTHER PUBLICATIONS

Abstract for German Pub. No. DE 19716154 A1, dated Oct. 22, 1998, for corresponding JP 2001-524090 A, 1 page.
Abstract for International Pub. No. WO 2004047495 A1, dated Jun. 3, 2004, for corresponding JP 2006-506307 A, 1 page.

(Continued)

*Primary Examiner* — Minh D A
(74) *Attorney, Agent, or Firm* — Lewis Roca Rothgerber Christie LLP

(57) ABSTRACT

A display device includes pixel circuits arranged in a matrix, each of the pixel circuits including: a light-emitting element; an optical sensor to detect luminance of light emitted from the light-emitting element; and a compensation control circuit including a first capacitor and a second capacitor, the first and second capacitors to maintain a second voltage applied to the compensation control circuit. The compensation control circuit controls the light-emitting element to constantly emit light having a luminance based on a first voltage during a first interval of a light emission interval. The compensation control circuit controls the amount of current supplied to the light-emitting element based on a detection result of the optical sensor and the second voltage maintained in the first and second capacitors during a second interval and a third interval of the light emission interval, respectively.

10 Claims, 13 Drawing Sheets

(56) References Cited

FOREIGN PATENT DOCUMENTS

| JP | 4007336 B2 | 11/2007 |
| JP | 2009-238833 A | 10/2009 |
| JP | 5277926 B2 | 8/2013 |

OTHER PUBLICATIONS

Abstract for Japanese Pub. No. JP 2005300897 A, dated Oct. 27, 2005, for corresponding JP 4007336 B2, 2 pages.
Abstract for Japanese Pub. No. JP 2010139895 A, dated Jun. 24, 2010, for corresponding JP 5277926 B2, 2 pages.

* cited by examiner

DISPLAY APPARATUS, DISPLAY METHOD, AND PROGRAM

CROSS-REFERENCE TO RELATED APPLICATION

This U.S. non-provisional patent application claims priority to and the benefit of Japanese Patent Application No. 2014-247998, filed on Dec. 8, 2014, the entire content of which is hereby incorporated by reference.

BACKGROUND

1. Field

One or more aspects of example embodiments of the inventive concept relate to a display apparatus, a display method, and a program.

2. Description to the Related Art

Recently developed is a flat panel display apparatus in which pixels including a self-light-emitting element, such as an organic light-emitting diode (OLED), are arranged in a matrix.

The self-light-emitting element (hereinafter referred to as a "light-emitting element" in some cases), such as an OLED, may deteriorate in proportion to a luminance of emitted light and a light-emitting time thereof. Since an image displayed on a display apparatus may not be uniform, light-emitting elements (OLEDs) may differently deteriorate. For example, a light-emitting element that displays a high-luminance color, such as white, tends to easily deteriorate compared to a light-emitting element that displays a low-luminance color, such as black.

When the deterioration of a light-emitting element is in progress, the luminance of the light-emitting element tends to become lower than that of a light-emitting element that deteriorates relatively slowly. As a result, for example, when a uniform color is displayed after a certain pattern is displayed for a long time, the pattern may remain visually recognizable. Such a phenomenon is generally known as "image sticking" (or "burn-in").

In an example for reducing a luminance difference between pixels due to the deterioration of the pixels, a part of light from a light-emitting element may be received by a photodiode included in a pixel circuit, and the amount of current supplied to the light-emitting element may be controlled on the basis of a result of the reception of light, thereby compensating for luminance deterioration of the light-emitting element. However, since a transistor for controlling the amount of current supplied to a light-emitting element is operated in a saturation region, characteristics of the transistor are changed, thereby causing unstable operation.

In an another example, a part of light from a light-emitting element may be received by a photodiode included in a pixel circuit, and a light-emitting time (duty ratio) of the light-emitting element may be controlled on the basis of a result of the reception of light, thereby compensating for luminance deterioration of the light-emitting element. However, since a light-emitting amount of a light-emitting element is controlled by regulating the duty ratio when light is emitted, a contour that was not originally contained (e.g., a false contour) in a video may be observed when the video is displayed.

The above information disclosed in this Background section is for enhancement of understanding of the background of the inventive concept, and therefore, it may contain information that does not constitute prior art.

SUMMARY

One or more aspects of example embodiments of the inventive concept relate to technology for preventing or substantially preventing the occurrence of a false contour.

One or more example embodiments of the inventive concept are directed toward a display apparatus, a display method, and a program for desirably compensating for the amount of light emission of a light-emitting element according to the amount of deterioration of the light-emitting element for each pixel.

According to an embodiment of the inventive concept, a display apparatus includes pixel circuits arranged in a matrix, each of the pixel circuits includes: a light-emitting element configured to emit light having a luminance based on an amount of current; an optical sensor configured to detect the luminance of the light emitted from the light-emitting element; and a compensation control circuit including a first capacitor and a second capacitor, the first and second capacitors configured to maintain a second voltage applied to the compensation control circuit, wherein a light emission interval of the light-emitting element includes: a first interval having a length during which the light-emitting element is configured to constantly emit light having a luminance based on a first voltage for controlling the luminance of the light-emitting element; a second interval; and a third interval, and wherein the compensation control circuit is configured to: control an amount of current supplied to the light-emitting element according to a detection result of the optical sensor and the second voltage maintained in the first capacitor, during the second interval; and control an amount of current supplied to the light-emitting element according to a detection result of the optical sensor and the second voltage maintained in the second capacitor, during the third interval.

In an embodiment, the first capacitor may be configured to maintain the second voltage applied during the second interval, and the second capacitor may be configured to maintain the second voltage applied during the third interval.

In an embodiment, the compensation control circuit may include a light emission control transistor configured to control an amount of a source-drain current thereof based on the second voltage maintained in at least one of the first capacitor or the second capacitor and a gate voltage determined according to the detection result of the optical sensor.

In an embodiment, the optical sensor may include a first optical sensor and a second optical sensor, the light emission control transistor may include a first light emission control transistor and a second light emission control transistor, one terminal of the first optical sensor and one terminal of the first capacitor may be connected to a gate terminal of the first light emission control transistor, one terminal of the second optical sensor and one terminal of the second capacitor may be connected to a gate terminal of the second light emission control transistor, the first light emission control transistor may be configured to control an amount of a source-drain current thereof based on the second voltage maintained in the first capacitor and a gate voltage determined according to a detection result of the first optical sensor, during the second interval, and the second light emission control transistor may be configured to control an amount of a source-drain current thereof based on the second voltage maintained in the second capacitor and a gate voltage determined according to a detection result of the second optical sensor, during the third interval.

In an embodiment, the display apparatus may further include a switching element configured to switch between the first capacitor and the second capacitor for maintaining the second voltage, and the light emission control transistor may be configured to control the amount of the source-drain current thereof based on the second voltage maintained in the first capacitor and the gate voltage determined according to a detection result of the optical sensor, during the second interval, and configured to control the amount of the source-drain current thereof based on the second voltage maintained in the second capacitor and the gate voltage determined according to a detection result of the optical sensor, during the third interval.

In an embodiment, the third interval may be before the second interval during an interval of one frame, and a capacitance of the first capacitor may be larger than that of the second capacitor.

In an embodiment, each of the pixel circuits may further include a driving transistor configured to control an amount of a source-drain current thereof based on the first voltage applied to a gate terminal of the driving transistor, and the amount of current supplied to the light-emitting element may be controlled based on the driving transistor and the compensation control circuit.

In an embodiment, the driving transistor may be located at a front stage of the compensation control circuit, and the compensation control circuit may be configured to control the amount of current supplied to the light-emitting element based on current supplied through the driving transistor.

According to an embodiment of the inventive concept, a method for displaying an image on a display apparatus including pixel circuits arranged in a matrix is provided, each of the pixel circuits including: a light-emitting element configured to emit light having a luminance based on an amount of current; an optical sensor configured to detect the luminance of the light emitted from the light-emitting element; and a compensation control circuit including a first capacitor and a second capacitor, the first and second capacitors configured to maintain a second voltage applied to the compensation control circuit, wherein a light emission interval of the light-emitting element includes: a first interval having a length during which the light-emitting element is configured to constantly emit light having a luminance based on a first voltage for controlling the luminance of the light-emitting element; a second interval; and a third interval, the method including: controlling an amount of current supplied to the light-emitting element based on a detection result of the optical sensor and the second voltage maintained in the first capacitor, during the second interval; and controlling the amount of current supplied to the light-emitting element based on a detection result of the optical sensor and the second voltage maintained in the second capacitor, during the third interval.

According to an embodiment of the inventive concept, a recording medium for storing a program including instructions for displaying an image on a display apparatus including pixel circuits arranged in a matrix is provided, each of the pixel circuits including: a light-emitting element configured to emit light having a luminance based on an amount of current; an optical sensor configured to detect the luminance of the light emitted from the light-emitting element; and a compensation control circuit including a first capacitor and a second capacitor, the first and second capacitors configured to maintain a second voltage applied to the compensation control circuit, wherein a light emission interval of the light-emitting element includes: a first interval having a length during which the light-emitting element is configured to constantly emit light having a luminance based on a first voltage for controlling the luminance of the light-emitting element; a second interval; and a third interval, the instructions of the program cause the compensation control circuit to: control an amount of current supplied to the light-emitting element based on a detection result of the optical sensor and the second voltage maintained in the first capacitor, during the second interval; and control the amount of current supplied to the light-emitting element based on a detection result of the optical sensor and the second voltage maintained in the second capacitor, during the third interval.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept, and together with the detailed description, explains aspects and features of the inventive concept. In the drawings.

DETAILED DESCRIPTION

Figure 1:
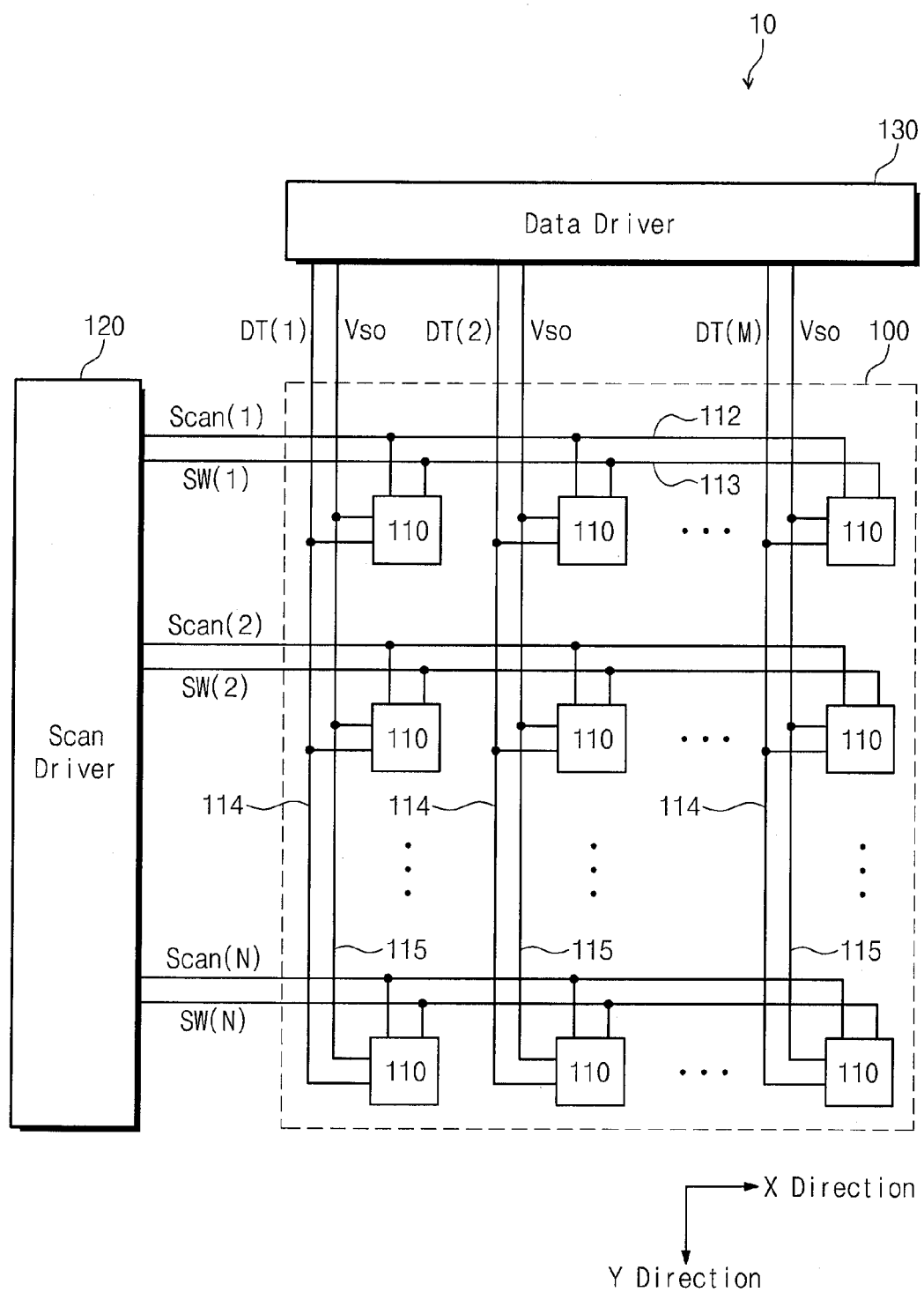
FIG. 1 is a diagram illustrating an exemplary configuration of a display apparatus according to one or more embodiments of the inventive concept.

Exemplary embodiments of the inventive concept will be described in more detail with reference to the accompanying drawings. In the description and the drawings, elements that have the same or substantially the same configuration are referred to by the same reference numeral to avoid overlapping descriptions.

1. First Embodiment 1.1. Configuration of Display Apparatus

An exemplary schematic configuration of a display apparatus according to a first embodiment of the inventive concept will be described with reference to FIG. 1. FIG. 1 is a diagram illustrating an exemplary configuration of a display apparatus according to the first embodiment of the inventive concept. In FIG. 1, a horizontal direction may be referred to as a row direction (e.g., an X direction), and a vertical direction may be referred to as a column direction (e.g., a Y direction). As illustrated in FIG. 1, a display apparatus 10 according to the first embodiment of the inventive concept includes a display unit 100, a scan driver 120, and a data driver 130.

The display unit 100 includes a plurality of pixel circuits 110. The display unit 100 displays an image corresponding to data signals on display pixels including the pixel circuits 110. In the display unit 100, a plurality of row scanning lines 112 and a plurality of compensation control signal lines 113 extend in the row direction (X direction). Furthermore, in the display unit 100, a plurality of data lines 114 and a plurality of compensation voltage signal lines 115 extend in the column direction (Y direction). Hereinafter, it is assumed that N (N is an integer greater than or equal to 2) number of the row scanning lines 112, N number of the compensation control signals lines 113, M (M is an integer greater than or equal to 2) number of the column data lines 114, and M number of the compensation voltage signal lines 115 are arranged on the display unit 100.

The pixel circuits 110 are respectively arranged at locations corresponding to crossing regions of the scanning lines 112 extending in the row direction (X direction) and the data lines 114 extending in the column direction (Y direction). A more detailed configuration of the pixel circuit 110 will be described later.

The display unit 100 is supplied with a first power supply voltage Vdd, a second power supply voltage Vss, and a reference voltage GND from an upper-level control circuit. For example, the first and second power supply voltages Vdd and Vss are signals for supplying current for enabling a light-emitting element included in the pixel circuit 110 to emit light.

The scanning lines 112 and the compensation control signal lines 113 arranged along the Y direction are connected to the scan driver 120. The scan driver 120 supplies a scan signal Scan to each pixel circuit 110 corresponding to each row through the scanning line 112 arranged for each row. Furthermore, the scan driver 120 supplies a signal SW to each pixel circuit 110 corresponding to each row through the compensation control signal line 113 arranged for each row. The scan signal Scan and the signal SW will be described in more detail later.

The data lines 114 and the compensation voltage signal lines 115 arranged along the X direction are connected to the data driver 130. Through the data line 114 arranged for each column, the data driver 130 may supply a DT signal (e.g., a data signal or data voltage) according to a luminance of emitted light (or on gradation) to each pixel circuit 110 corresponding to each column. Furthermore, through the compensation voltage signal line 115 arranged for each column, the data driver 130 applies an initial sensor voltage Vso that is pre-adjusted to a potential (e.g., a predetermined potential) to each pixel circuit 110 corresponding to each column. The DT signal and the initial sensor voltage Vso will be described in more detail later.

1.2. Configuration of Pixel Circuit

Figure 2:
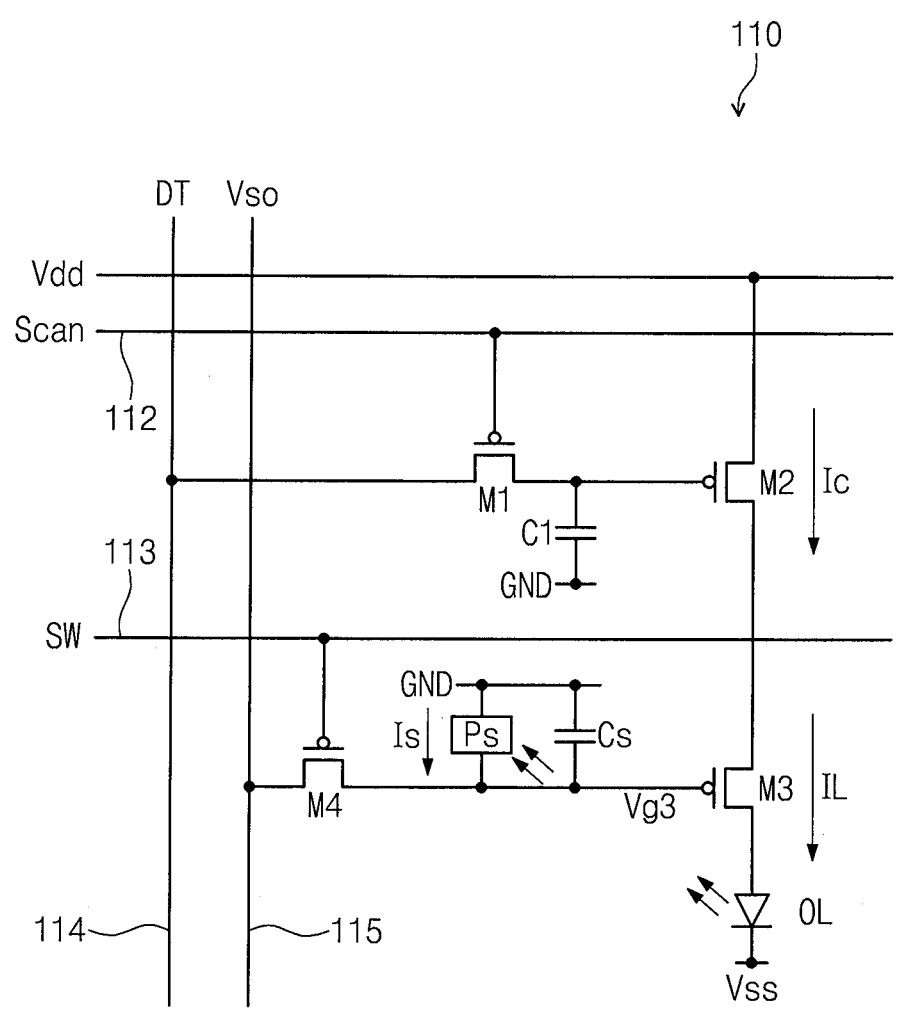
FIG. 2 is a diagram illustrating an exemplary configuration of a pixel circuit according to a first embodiment of the inventive concept.

An exemplary configuration of a pixel circuit according to the first embodiment of the inventive concept will be described with reference to FIG. 2. FIG. 2 is a diagram illustrating an exemplary configuration of a pixel circuit according to the first embodiment of the inventive concept.

FIG. 2 illustrates an example of the pixel circuit 110 arranged at a location corresponding to a crossing region of an ith row and a jth column among the pixel circuits 110 included in the display unit 100 illustrated in FIG. 1. Since the other pixel circuits 110 may have the same or substantially the same configuration as that of the pixel circuit 110 shown in FIG. 2, detailed descriptions of the other pixel circuits 110 will be omitted.

As illustrated in FIG. 2, the pixel circuit 110 includes an organic light-emitting diode OL, a retention capacitor C1, a switching transistor M1, a driving transistor M2, an optical sensor Ps, a sensor capacitor Cs, a light emission control transistor M3, and a switching transistor M4.

The driving transistor M2 and the light emission control transistor M3 may include, for example, P-channel metal-oxide semiconductor field-effect transistors (MOSFETs).

As illustrated in FIG. 2, a drain terminal of the driving transistor M2 is connected to a source terminal of the light emission control transistor M3, and a source terminal of the driving transistor M2 is connected to a signal line for supplying the first power supply voltage Vdd. A drain terminal of the light emission control transistor M3 is connected to an anode of the organic light-emitting diode OL. A cathode of the organic light-emitting diode OL is connected to the second power supply voltage Vss (e.g., a source of the second power supply voltage Vss).

A source terminal of the switching transistor M1 is connected to the data line 114, and a drain terminal of the switching transistor M1 is connected to a gate terminal of the driving transistor M2. The switching transistor M1 is turned on/off by the scan signal Scan transferred to a gate terminal of the switching transistor M1 through the scanning line 112.

One terminal of the retention capacitor C1 is connected to the gate terminal of the driving transistor M2, and the other terminal of the retention capacitor C1 is connected to the reference voltage GND. The retention capacitor C1 maintains or substantially maintains a potential of the driving transistor M2.

That is, as the switching transistor M1 is turned on, the DT signal according to the luminance of emitted light (or on gradation) is transferred from the data driver 130 (see FIG. 1) to the gate terminal of the driving transistor M2 through the data line 114. Thereafter, as the switching transistor M1 is turned off, the DT signal transferred through the data line 114 is maintained or substantially maintained in the retention capacitor C1.

A source terminal of the switching transistor M4 is connected to the compensation voltage signal line 115, and a drain terminal of the switching transistor M4 is connected to a gate terminal of the light emission control transistor M3. The switching transistor M4 is turned on/off by the signal SW transferred to a gate terminal of the switching transistor M4 through the compensation control signal line 113.

The optical sensor Ps may include, for example, a photodiode or a phototransistor. For example, polysilicon, amorphous silicon, and/or the like may be used as a material of the optical sensor Ps. One terminal of the optical sensor Ps is connected to the gate terminal of the light emission control transistor M3, and the other terminal of the optical sensor Ps is connected to the reference voltage GND. The optical sensor Ps is arranged such that a part (or portion) of light emitted from the organic light-emitting diode OL is irradiated on the optical sensor Ps.

One terminal of the sensor capacitor Cs is connected to the gate terminal of the light emission control transistor M3, and the other terminal of the sensor capacitor Cs is connected to the reference voltage GND. The sensor capacitor Cs maintains or substantially maintains a potential Vg3 of the gate terminal of the light emission control transistor M3.

Once the switching transistor M4 is turned on, the initial sensor voltage Vso (Vso<0) that is pre-adjusted to a potential (e.g., a predetermined potential) is applied from the data driver 130 (see FIG. 1) to the gate terminal of the light emission control transistor M3 through the compensation voltage signal line 115. The initial sensor voltage Vso may correspond to an example of a "second voltage." The initial sensor voltage Vso may be set at a sufficiently low voltage, so that the light emission control transistor M3 is operated in a linear region.

Then, the light emission control transistor M3 is turned on, and the driving transistor M2 is selectively turned on according to the DT signal transferred from the data line 114 that is maintained or substantially maintained in the retention capacitor C1. Furthermore, a driving current Ic according to the DT signal maintained or substantially maintained in the retention capacitor C1 is supplied to the organic light-emitting diode OL through the light emission control transistor M3. A light emission state of the organic light-emitting diode OL is controlled by the light emission control transistor M3. Hereinafter, a current that flows between the drain and the source of the light emission control transistor M3 may be referred to as a current IL, in the case where the current that flows between the drain and the source of the light emission control transistor M3 is differentiated from the driving current Ic.

Thereafter, once the switching transistor M4 is turned off, the gate terminal of the light emission control transistor M3 is in a floating state. Accordingly, the initial sensor voltage Vso applied through the compensation voltage signal line 115 is maintained or substantially maintained in the sensor capacitor Cs. Furthermore, at this time, the light emission control transistor M3 is turned on, and the current IL that flows between the drain and the source of the light emission control transistor M3 is equal to or substantially equal to the driving current Ic.

Thereafter, the initial sensor voltage Vso that is maintained in the sensor capacitor Cs is discharged by a sensing current Is, based on a detection result of the optical sensor Ps. Due to the discharge, a gate voltage Vg3 of the light emission control transistor M3 becomes higher than the initial sensor voltage Vso. Furthermore, when the gate voltage Vg3 reaches a threshold voltage Vth3 of the light emission control transistor M3, the light emission control transistor M3 is turned off, and the current IL becomes equal to or substantially equal to 0 (i.e., the organic light-emitting diode OL is turned off).

A time taken for the light emission control transistor M3 to be turned off after the switching transistor M4 is turned off is determined according to a relationship between the sensing current Is and the sensor capacitor Cs. In more detail, as the luminance of the organic light-emitting diode OL becomes higher, an amount of the sensing current Is increases, and a discharge time of the sensor capacitor Cs becomes shorter. In other words, as the luminance of the organic light-emitting diode OL becomes lower, the amount of the sensing current Is decreases, and the discharge time of the sensor capacitor Cs becomes longer.

Therefore, for example, in the case where the luminance of the organic light-emitting diode OL decreases due to deterioration thereof, the amount of the sensing current Is decreases, and the discharge time of the sensor capacitor Cs becomes longer. Accordingly, after deterioration of the organic light-emitting diode OL, a period of time during which the light emission control transistor M3 is turned on is longer than that before the deterioration, so that an effective luminance of the organic light-emitting diode OL increases, thereby compensating for the luminance deterioration of the organic light-emitting diode OL.

An exemplary configuration of a pixel circuit according to the first embodiment of the inventive concept has been described with reference to FIG. 2.

1.3. Driving Timing

Figure 3:
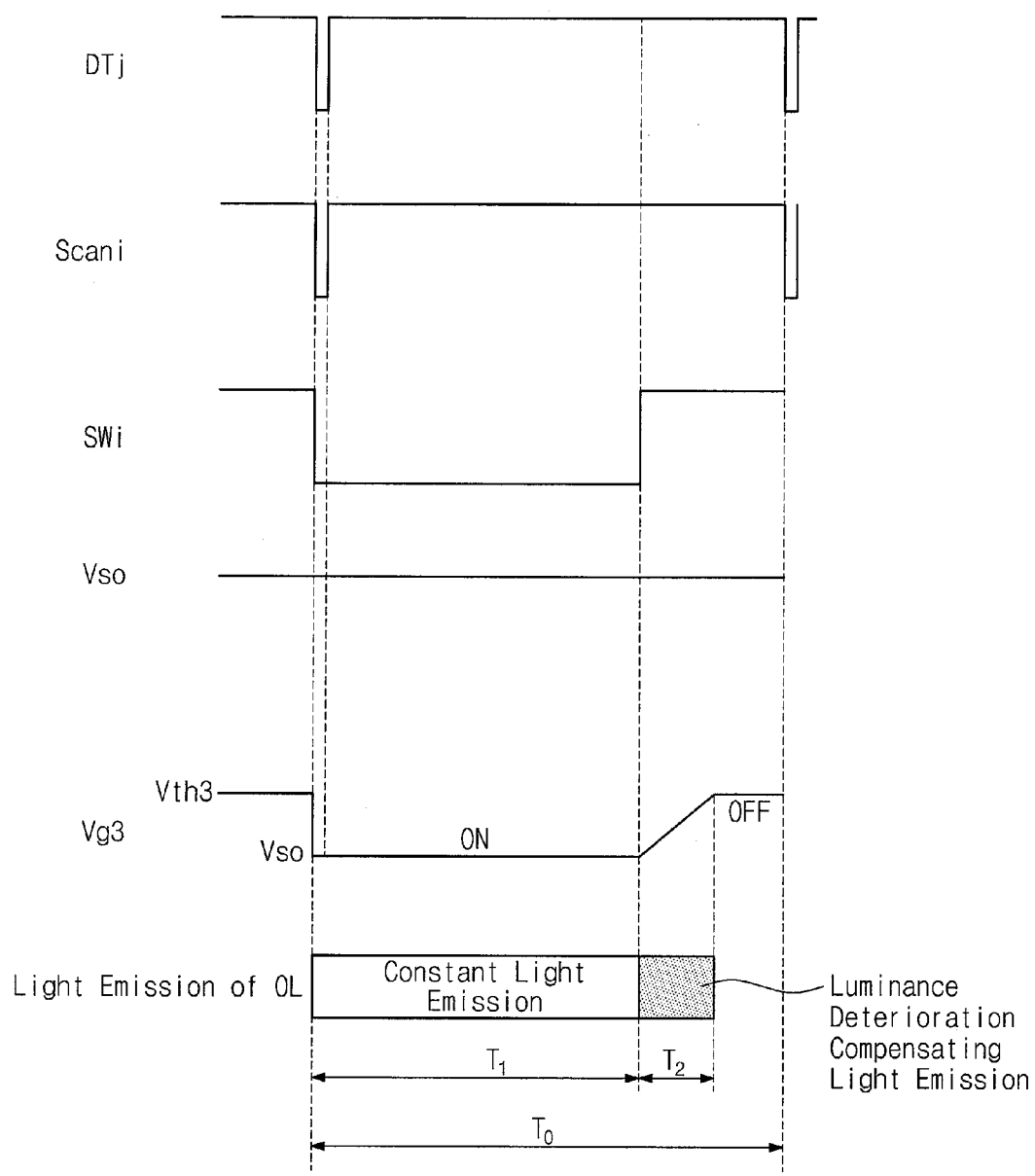
FIG. 3 is a schematic timing chart illustrating an exemplary driving timing of a pixel circuit according to the first embodiment of the inventive concept.

An exemplary driving timing of each element of the pixel circuit 110 of FIG. 2 will be described with reference to FIG. 3. FIG. 3 is a schematic timing chart illustrating an exemplary driving timing of the pixel circuit 110 according to the first embodiment of the inventive concept. The pixel circuit 110 located at a crossing region of the ith row and the jth column is described below as an example. Since the other pixel circuits 110 have the same or substantially the same structure as the exemplary pixel circuit 110, detailed descriptions of the other pixel circuits 110 are not provided.

In FIG. 3, a reference sign $T_0$ represents a light emission interval for displaying an image by operating the organic light-emitting diode OL to emit light during an interval of one frame. For convenience, in the timing chart of FIG. 3, the light emission interval $T_0$ of the organic light-emitting diode OL is shown as the interval of one frame, and other intervals for a control operation may not be shown. Therefore, for example, a control interval and/or the like for compensating for a change in a threshold value of a driving transistor may be provided in addition to the light emission interval $T_0$ during the interval of one frame.

As illustrated in FIG. 3, the light emission interval $T_0$ is divided into a constant light emission interval $T_1$ and a luminance deterioration compensating light emission interval $T_2$, so that the pixel circuit 110 according to the first embodiment of the inventive concept is controlled according to the intervals. The constant light emission interval $T_1$ represents an interval during which the organic light-emitting diode OL is enabled to constantly emit light on the basis of the driving current Ic. The driving current Ic is determined by the DT signal based on the luminance of emitted light (or on gradation). During the luminance deterioration compensating light emission interval $T_2$, the amount of the current IL supplied to the organic light-emitting diode OL and an interval during which the current IL is supplied are controlled according to a detection result of the optical sensor Ps, so that the luminance deterioration of the organic light-emitting diode OL is compensated for. The constant light emission interval $T_1$ corresponds to an example of a "first interval." The luminance deterioration compensating light emission interval $T_2$ corresponds to an example of a "second interval."

Hereinafter, each timing of FIG. 3 is described in more detail below with reference to the configuration of the pixel circuit 110 of FIG. 2.

As illustrated in FIG. 3, the switching transistor M1 of the pixel circuit 110 is turned on by an L-level (e.g., a low level) scan signal (e.g., Scan i) supplied through the scanning line 112 of the ith row. Accordingly, the DT signal based on the luminance of emitted light (or on gradation) is transferred to the gate terminal of the driving transistor M2 of the pixel circuit 110 through the data line 114 of the jth column. Furthermore, when the scan signal reaches an H-level (e.g., a high level), the switching transistor M1 is turned off, and the DT signal (e.g., DT j) transferred through the data line 114 is maintained or substantially maintained in the retention capacitor C1. The DT signal maintained or substantially maintained in the retention capacitor C1 corresponds to an example of a "first voltage."

As described above, the DT signal based on the luminance of emitted light is maintained or substantially maintained in the retention capacitor C1 in synchronization with the scan signal. An interval during which the scan signal reaches the L-level and the DT signal is maintained or substantially maintained in the retention capacitor C1 (e.g., data is written to the pixel circuit 110) may be equal to or substantially equal to about 10 μs. However, the interval during which the DT signal is maintained or substantially maintained in the retention capacitor C1 is not limited thereto, and the interval may vary with the number of the pixel circuits 110 (e.g., a pixel number) included in the display unit 100.

Furthermore, in synchronization with initiation (e.g., a start) of supplying of the L-level scan signal, an L-level (e.g., a low level) signal SW (e.g., SW i) starts to be supplied through the compensation control signal line 113 of the ith row, and the switching transistor M4 of the pixel circuit 110 is turned on. Then, the initial sensor voltage Vso (Vso<0) that is pre-adjusted to a potential (e.g., a predetermined potential) is applied as the gate voltage Vg3 to the gate terminal of the light emission control transistor M3 of the pixel circuit 110 through the compensation voltage signal line 115 of the jth column.

Then, the light emission control transistor M3 is turned on, and the driving transistor M2 is selectively turned on according to the DT signal (e.g., DT j) transferred from the data line 114 and maintained or substantially maintained in the retention capacitor C1. Furthermore, the driving current Ic based on the DT signal maintained or substantially maintained in the retention capacitor C1 is supplied to the organic light-emitting diode OL through the light emission control transistor M3. Therefore, the organic light-emitting diode OL emits light having a luminance corresponding to the driving current Ic.

An interval during which the organic light-emitting diode OL emits light having a luminance corresponding to the driving current Ic corresponds to the constant light emission interval $T_1$. That is, the constant light emission interval $T_1$ corresponds to an interval during which the switching transistor M4 is turned on by the L-level signal SW, and the light emission control transistor M3 is driven on the basis of the initial sensor voltage Vso.

Thereafter, when the signal SW reaches the H level, the switching transistor M4 is turned off, and the initial sensor voltage Vso applied through the compensation voltage signal line 115 is maintained or substantially maintained in the sensor capacitor Cs.

Thereafter, the initial sensor voltage Vso maintained or substantially maintained in the sensor capacitor Cs is discharged by the sensing current Is based on a detection result of the optical sensor Ps. Due to the discharge, the gate voltage Vg3 of the light emission control transistor M3 becomes higher than the initial sensor voltage Vso. Furthermore, when the gate voltage Vg3 reaches the threshold voltage Vth3 of the light emission control transistor M3, the light emission control transistor M3 is turned off, and the current IL becomes equal to or substantially equal to 0 (i.e., the organic light-emitting diode OL is turned off).

Moreover, the initial sensor voltage Vso maintained or substantially maintained in the sensor capacitor Cs is discharged by the sensing current Is based on a detection result of the optical sensor Ps. Accordingly, an interval during which the gate voltage Vg3 of the light emission control transistor M3 is controlled corresponds to the luminance deterioration compensating light emission interval $T_2$. As described above, a length of the luminance deterioration compensating light emission interval $T_2$ corresponds to the discharge time of the sensor capacitor Cs. In addition, the length of the luminance deterioration compensating light emission interval $T_2$ is determined according to a relationship between the sensing current Is and the sensor capacitor Cs.

As described above, in the example of FIG. 3, the pixel circuit 110 is driven with a duty ratio of $(T_1+T_2)/T_0$. As the constant light emission interval $T_1$ is longer (e.g., as the interval during which the signal SW is in the L level is longer), the duty ratio is higher. Therefore, the constant light emission interval $T_1$ may be set to be relatively long, so as to prevent or substantially prevent the occurrence of a false contour.

The above-described series of operations may be performed by a program for operating a central processing unit (CPU) for operating each element of the display apparatus 10. The program may be run by an operating system (OS) installed in the apparatus. A storage location of the program is not limited if it is readable by a device including an element for performing the above-mentioned processing. For example, the program may be stored in a recording medium accessed from the outside of the apparatus. In this case, the recording medium in which the program is stored may be accessible by the apparatus, so that the CPU of the apparatus may execute the program.

An exemplary driving timing of each element of the pixel circuit 110 of FIG. 2 has been described with reference to FIG. 3.

1.4. Principle of Compensation for Luminance Deterioration

With reference to the configuration of the pixel circuit 110 illustrated in FIG. 2, a principle of operation of the display apparatus 10 for compensating for the luminance deterioration of the organic light-emitting diode OL will be described with simple model equations.

Firstly, described below is a first model based on the inference that a resistance Rs of the optical sensor Ps of the pixel circuit 110 is inversely proportional to the luminance of the organic light-emitting diode OL. In the case where the current IL between the drain and the source of the light emission control transistor M3 is equal to or substantially equal to the driving current Ic, the luminance of the organic light-emitting diode OL is proportional to the driving current Ic. In the case where the current IL between the drain and the source of the light emission control transistor M3 is equal to or substantially equal to 0, the luminance of the organic light-emitting diode OL is equal to or substantially equal to 0. A luminance deterioration ratio that represents a ratio of post-deterioration luminance to pre-deterioration luminance is referred to as a variable "a." In this case, in a state in which the organic light-emitting diode OL emits light, the resistance Rs of the optical sensor Ps is expressed as Equation (1) below, since the resistance Rs of the optical sensor Ps is inversely proportional to a·Ic. In Equation (1), $K_{rs}$ is a constant for determining a relationship between the resistance Rs and a·Ic.

$$Rs = \frac{K_{rs}}{a \cdot Ic} \quad (1)$$

A relationship between the gate voltage Vg3 of the light emission control transistor M3 and the resistance Rs of the optical sensor Ps is expressed as Equation (2) below.

$$dV_g = -\frac{Isdt}{Cs} = -\frac{V_{g3}dt}{RsCs} \quad (2)$$
$$\frac{1}{V_{g3}}dV_{g3} = -\frac{dt}{RsCs}$$

Equation (3) below is derived through an integral of Equation (2) over t in the interval from 0 to t, and an integral of Equation (2) over Vg3 in the interval from Vso to Vg3.

$$V_{g3} = V_{so} \exp(-t/CsRs) \quad (3)$$

Equation (4) below is derived by substituting Equation (1) for Equation (3) and with t=T$_2$ and Vg3=Vth3. In Equation (4), K2 is a constant for determining a relation between a·Ic, the sensor capacitor C2, and a time T$_2$.

$$T_2 = RsCs\ln(V_{so}/V_{th3}) = \frac{CsK_{rs}}{a \cdot Ic}\ln(V_{so}/V_{th3}) = \frac{CsK_2}{a \cdot Ic} \quad (4)$$
$$(K_2 = K_{rs}\ln(V_{so}/V_{th3}))$$

Next, described below is a second model based on the inference that a value of the sensing current Is that flows through the optical sensor Ps (hereinafter simply referred to as a "current value Is," in some cases) is proportional to the luminance of the organic light-emitting diode OL. In the case where the current IL between the drain and the source of the light emission control transistor M3 is equal to or substantially equal to the driving current Ic, the luminance of the organic light-emitting diode OL is proportional to the driving current Ic. In the case where the current IL between the drain and the source of the light emission control transistor M3 is equal to or substantially equal to 0, the luminance of the organic light-emitting diode OL is equal to or substantially equal to 0. In addition, in the case where the luminance deterioration ratio is equal to "a," while the organic light-emitting diode OL emits light, the current value Is of the optical sensor Ps is proportional to a·Ic, so that Equation (5) below is obtained.

$$Is = K_{is} \cdot a \cdot Ic \quad (5)$$

A relationship between the gate voltage Vg3 of the light emission control transistor M3 and the current value Is of the optical sensor Ps is expressed as Equation (6) below.

$$dV_{g3} = -\frac{Isdt}{Cs} \quad (6)$$

Equation (7) below is derived through an integral of Equation (6) over t in the interval from 0 to t, and an integral of Equation (6) over Vg3 in the interval from Vso to Vg3.

$$V_{g3} = V_{so} - \frac{Is \cdot t}{Cs} \quad (7)$$

Equation (8) below is derived by substituting Equation (5) for Equation (7) and with t=T$_2$ and Vg3=Vth3.

$$T_2 = \frac{Cs}{Is}(V_{so} - V_{th3}) = \frac{Cs}{K_{is} \cdot a \cdot Ic}(V_{so} - V_{th3}) = \frac{CsK_2}{a \cdot Ic} \quad (8)$$
$$\left(K_2 = \frac{(V_{so} - V_{th3})}{K_{is}}\right)$$

As expressed in Equations (4) and (8), the time T$_2$ is expressed as the same equation, even if the integer K2 is differently defined with respect to the first and second models. As a result, a luminance L is expressed as Equation (9) below using a proportional coefficient K1 that represents a proportional relationship between the luminance L and the driving current Ic.

$$L = a \cdot K_1 Ic \frac{(T_1 + T_2)}{T_0} = a \cdot K_1 Ic\left(\frac{T_1}{T_0} + \frac{CsK_2}{a \cdot IcT_0}\right) \quad (9)$$

Here, the duty ratio of $(T_1+T_2)/T_0$ described above with reference to FIG. 3 does not exceed about 100%, and thus, is expressed as a conditional expression of Equation (10) below.

$$\frac{T_1}{T_0} + \frac{CsK_2}{a \cdot IcT_0} > 1 \rightarrow \frac{T_1}{T_0} + \frac{CsK_2}{a \cdot IcT_0} = 1 \quad (10)$$

In the case where the luminance deterioration ratio is equal to or substantially equal to 1 (e.g., no deterioration) on the basis of Equation (9) representing the luminance L and the conditional expression of Equation (10), a pre-deterioration luminance Li of the organic light-emitting diode OL (hereinafter referred to as an "initial luminance Li," in some cases) is expressed as Equation (11) below.

$$Li = K_1 Ic\left(\frac{T_1}{T_0} + \frac{CsK_2}{a \cdot IcT_0}\right) \quad (11)$$

Furthermore, in the case where the luminance deterioration ratio a<1, a post-deterioration luminance Ld of the organic light-emitting diode OL is expressed as Equation (12) below.

$$Ld = a \cdot K_1 Ic\left(\frac{T_1}{T_0} + \frac{CsK_2}{a \cdot IcT_0}\right) \quad (12)$$

Here, on the basis of Equations (11) and (12), a luminance deterioration ratio Ld/Li obtained after compensating for luminance deterioration is expressed as Equation (13) below.

$$Ld/Li = \left(\frac{a \cdot T_1}{T_0} + \frac{CsK_2}{IcT_0}\right) / \left(\frac{T_1}{T_0} + \frac{CsK_2}{IcT_0}\right) \quad (13)$$

Furthermore, under the conditions (e.g., predetermined conditions) of the luminance deterioration ratio "a" and the driving current Ic, in the case where the duty ratio obtained after deterioration is about 100% (e.g., equal to or substantially equal to 1), the post-compensation-luminance deterioration ratio Ld/Li may be construed as having a maximum value. Here, a condition for the case where the post-deterioration duty ratio is about 100% (e.g., equal to or substantially equal to 1) is expressed as Equation (14) below.

$$\frac{T_1}{T_0} + \frac{CsK_2}{a \cdot IcT_0} = 1 \quad (14)$$

$$K_2 = \frac{a \cdot IcT_0}{Cs}\left(1 - \frac{T_1}{T_0}\right)$$

Furthermore, in the case where the maximum value of the post-compensation luminance deterioration ratio Ld/Li is equal to Ld/Li(max), Ld/Li(max) is expressed as Equation (15) below.

$$Ld/Li(\text{max}) = a / \left(a + (1-a)\frac{T_1}{T_0}\right) \quad (15)$$

Figure 4:
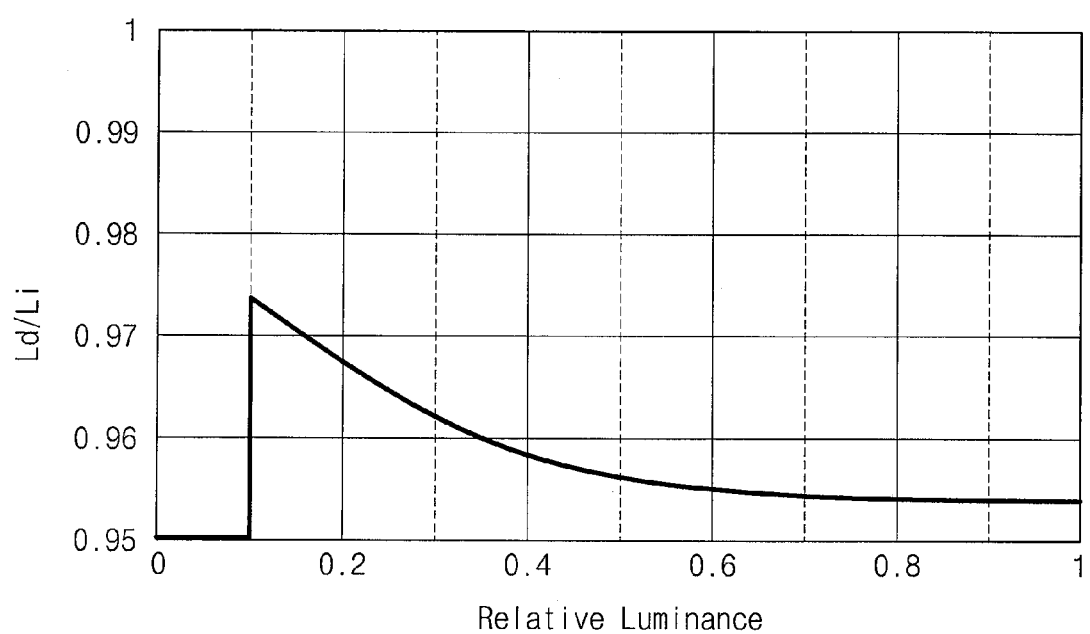
FIG. 4 is a diagram illustrating an exemplary relationship between a relative luminance and a post-compensation luminance deterioration ratio of a display apparatus according to the first embodiment of the inventive concept.

FIG. 4 illustrates an exemplary relationship between a relative luminance and the post-compensation luminance deterioration ratio Ld/Li, of the display apparatus 10 according to the first embodiment of the inventive concept. In FIG. 4, the vertical axis represents the post-compensation luminance deterioration ratio Ld/Li. The horizontal axis represents the relative luminance. Herein, it is assumed that the relative luminance represents a luminance that is normalized, so that a full-white luminance (e.g., a maximum value of a luminance) is equal to or substantially equal to about 100%.

It is assumed that the luminance deterioration ratio "a" of the organic light-emitting diode OL is equal to or substantially equal to about 0.95, and a ratio of the constant light emission interval $T_1$ to the light emission interval $T_0$ during one frame (e.g., a duty ratio of the constant light emission interval $T_1$) $T_1/T_0$ is equal to or substantially equal to about 0.5. Here, FIG. 4 illustrates an exemplary relationship between the relative luminance and the post-compensation luminance deterioration ratio Ld/Li in the case where Equation (14) above is satisfied at the driving current value Ic at which the relative luminance is equal to or substantially equal to about 10%.

In the example of FIG. 4, when the relative luminance is equal to or substantially equal to about 10%, the post-compensation luminance deterioration ratio Ld/Li becomes a maximum value (Ld/Li=0.974) based on Equation (15) above.

Referring to FIG. 4, it is shown that, when the relative luminance is lower than a luminance at which the post-compensation luminance deterioration ratio Ld/Li is maximized, the post-compensation luminance deterioration ratio Ld/Li decreases rapidly as the relative luminance decreases, and converges to the luminance deterioration ratio "a" of 0.95 of the organic light-emitting diode OL. This is because the initial luminance Li at which the duty ratio is not greater than about 100% increases due to a decrease in the driving current Ic, whereas the duty ratio is fixed to about 100% with respect to the post-deterioration luminance Ld based on Equation (10) above. Furthermore, regarding the relative luminance that is lower than a luminance at which the duty ratio is about 100% with respect to the initial luminance Li, the post-compensation luminance deterioration ratio Ld/Li is equal to or substantially equal to the luminance deterioration ratio "a" of the organic light-emitting diode OL, and thus, has a constant or substantially constant value of about 0.95.

On the other hand, when the relative luminance is higher than the luminance at which the post-compensation luminance deterioration ratio Ld/Li is maximized, the post-compensation luminance deterioration ratio Ld/Li decreases slowly as the relative luminance increases. This is because the luminance deterioration compensating light emission interval $T_2$ decreases slowly from $1-T_1/T_0=0.5$ towards 0.

As described above, according to sensitivity characteristics of the optical sensor Ps, and/or design parameters of the optical sensor Ps (e.g., a sensor size, an amount of light irradiated to a sensor, a capacitance value of the sensor capacitor Cs, and/or the like) may be appropriately chosen (e.g., determined) in consideration of a target luminance deterioration ratio "a," so as to set the luminance deterioration compensating light emission interval $T_2$. In general, it may be desirable to allow compensation for luminance deterioration in a wide luminance range. However, if the relative luminance at which the post-compensation luminance deterioration ratio Ld/Li has a maximum value is decreased, the post-compensation luminance deterioration ratio Ld/Li tends to decrease with respect to a high luminance. Therefore, it may be desirable to set a luminance at which the post-compensation luminance deterioration ratio Ld/Li has a maximum value within a range from about 10% to about 20%.

Furthermore, as described above, the optical sensor Ps may include, for example, a photodiode or a phototransistor. In general, a photodiode tends to have characteristics close to those of the second model. A phototransistor tends to have intermediate characteristics between those of the first model and those of the second model.

In the above description, a P-channel transistor is exemplarily used as each transistor of the pixel circuit 110 of FIG. 2, but the present invention is not limited thereto. For example, an N-channel transistor may be used as each transistor of the pixel circuit 110 of FIG. 2. In this case, relationships among signals in terms of potential may be modified, as appropriate, according to characteristics of each transistor.

A principle of operation of the display apparatus 10 for compensating for the luminance deterioration of the organic light-emitting diode OL has been described based on simple model equations with reference to FIGS. 2 and 4.

1.5. Summary

As described above, the light emission interval $T_0$ of one frame is divided into the constant light emission interval $T_1$ and the luminance deterioration compensating light emission interval $T_2$, so that the display apparatus 10 according to the first embodiment of the inventive concept is controlled according to the intervals. Based on this configuration, the display apparatus 10 controls the luminance of the organic light-emitting diode OL according to the luminance of emitted light (or on gradation) during the constant light emission interval $T_1$. Furthermore, the display apparatus 10 controls the length of the luminance deterioration compensating light emission interval $T_2$ following the constant light emission interval $T_1$, so as to compensate for the amount of light emitted from the organic light-emitting diode OL according to the amount of luminance deterioration of the organic light-emitting diode OL (e.g., compensate for the luminance deterioration).

Thus, the display apparatus 10 according to the first embodiment of the inventive concept is able to individually control the compensation for the luminance deterioration of the organic light-emitting diode OL and the luminance of the organic light-emitting diode OL according to the luminance of emitted light (or on gradation). That is, according to the display apparatus 10 according to the first embodiment of the inventive concept, the luminance of the organic light-emitting diode OL may be set, and a light emission amount may be compensated according to the amount of luminance deterioration of the organic light-emitting diode OL. Furthermore, according to the display apparatus 10 of the first embodiment of the inventive concept, the length of the constant light emission interval $T_1$ may be appropriately changed. Therefore, according to the display apparatus 10 of the first embodiment of the inventive concept, the length of the constant light emission interval $T_1$ may be appropriately set according to an operation type of the display apparatus 10, so that the occurrence of a false contour may be avoided or reduced.

Moreover, according to the display apparatus 10 of the first embodiment of the inventive concept, design parameters of the optical sensor Ps (e.g., a sensor size, an amount of light irradiated to a sensor, a capacitance value of the sensor capacitor Cs, and/or the like) may be appropriately chosen (e.g., determined) according to sensitivity characteristics of the optical sensor Ps, so as to appropriately adjust the luminance deterioration compensating light emission interval $T_2$ according to a target luminance deterioration ratio "a." That is, according to the display apparatus 10 of the first embodiment of the inventive concept, the luminance deterioration compensating light emission interval $T_2$ may be appropriately set according to an operation type of the display apparatus 10.

Second Embodiment

A display apparatus according to a second embodiment of the inventive concept will be described. The display apparatus according to the present embodiment of the inventive concept is different from the display apparatus according to the first embodiment of the inventive concept with respect to the configuration or the driving timing of the pixel circuit 110. Therefore, the configuration or the driving timing of the pixel circuit 110 of the display apparatus according to the present embodiment of the inventive concept will be particularly described in more detail, and detailed descriptions of other elements are not provided.

2.1. Configuration of Pixel Circuit

Figure 5:
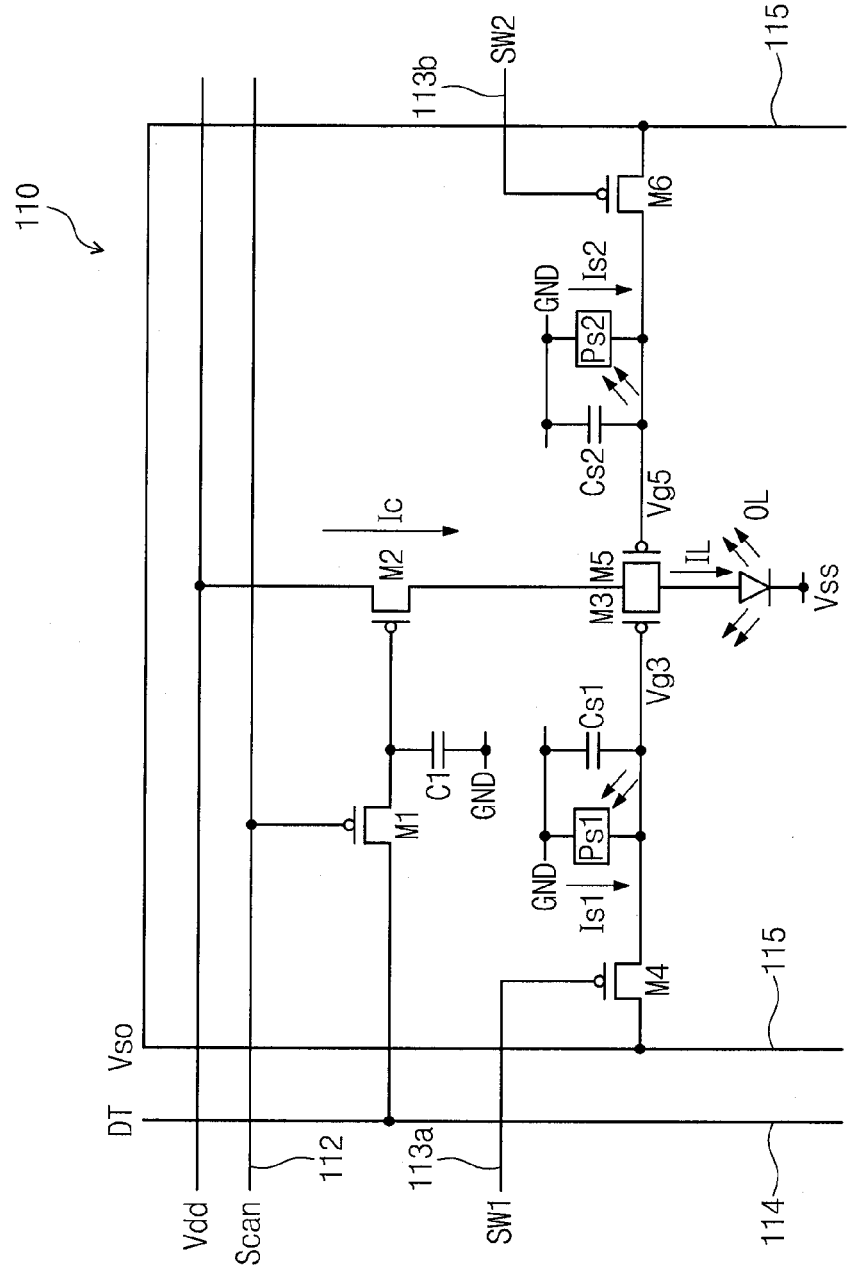
FIG. 5 is a diagram illustrating an exemplary configuration of a pixel circuit according to a second embodiment of the inventive concept.

An exemplary configuration of a pixel circuit according to another embodiment of the inventive concept will described with reference to FIG. 5. FIG. 5 is a diagram illustrating an exemplary configuration of a pixel circuit according to a second embodiment of the inventive concept.

FIG. 5 illustrates an example of the pixel circuit 110 arranged at a crossing region of the ith row and the jth column among the pixel circuits 110 included in the display unit 100 illustrated in FIG. 1. Since the other pixel circuits 110 may have the same or substantially the same configuration as that of the pixel circuit 110 of FIG. 5, detailed descriptions of the other pixel circuits 110 are not provided.

As illustrated in FIG. 5, compared to the pixel circuit 110 (see FIG. 2) according to the first embodiment of the inventive concept, the pixel circuit 110 according to the second embodiment of the inventive concept includes a dual-system circuit for compensating for luminance deterioration, the circuit including optical sensors Ps1 and Ps2, sensor capacitors Cs1 and Cs2, light emission control transistors M3 and M5, and switching transistors M4 and M6.

That is, the pixel circuit 110 according to the second embodiment of the inventive concept includes an organic light-emitting diode OL, a retention capacitor C1, a switching transistor M1, a driving transistor M2, the optical sensors Ps1 and Ps2, the sensor capacitors Cs1 and Cs2, the light emission control transistors M3 and M5, and the switching transistors M4 and M6.

The driving transistor M2 and the light emission control transistors M3 and M5 may include, for example, P-channel MOSFETs.

The source terminal of the driving transistor M2 is connected to a signal line for supplying the first power supply voltage Vdd, and the drain terminal of the driving transistor M2 is connected to the source terminals of the light emission control transistors M3 and M5. The drain terminals of the light emission control transistors M3 and M5 are connected to the anode of the organic light-emitting diode OL. The cathode of the organic light-emitting diode OL is connected to the second power supply voltage Vss (e.g., a source of the second power supply voltage Vss). That is, the light emission control transistors M3 and M5 are connected in parallel between the driving transistor M2 and the organic light-emitting diode OL.

The driving transistor M2, the retention capacitor C1, and the switching transistor M1 respectively correspond to the driving transistor M2, the retention capacitor C1, and the switching transistor M1 of the pixel circuit 110 according to the first embodiment of the inventive concept (see FIG. 2). Since a connection relationship among the driving transistor M2, the retention capacitor C1, and the switching transistor M1 is the same or substantially the same as that of the pixel circuit 110 according to the first embodiment of the inventive concept, a detailed description of the connection relationship is not repeated.

In the display apparatus 10 according to the second embodiment of the inventive concept, signals SW1 and SW2 that correspond to the signal SW of the first embodiment of the inventive concept may be individually supplied to the pixel circuit 110. A first compensation control signal line 113a of FIG. 5 is a signal line for supplying the signal SW1 to the pixel circuit 110. A second compensation control signal line 113b is a signal line for supplying the signal SW2 to the pixel circuit 110. Furthermore, like the signal SW of the first embodiment of the inventive concept, the signals SW1 and SW2 may be supplied to each pixel circuit 110 by the scan driver 120.

The source terminal of the switching transistor M4 is connected to a compensation voltage signal line 115, and the drain terminal of the switching transistor M4 is connected to the gate terminal of the light emission control transistor M3. The switching transistor M4 is turned on/off by the signal SW1 that is transferred to the gate terminal of the switching transistor M4 through the compensation control signal line 113a.

The source terminal of the switching transistor M6 is connected to the compensation voltage signal line 115, and the drain terminal of the switching transistor M6 is connected to the gate terminal of the light emission control transistor M5. The switching transistor M6 is turned on/off by the signal SW2 that is transferred to the gate terminal of the switching transistor M6 through the compensation control signal line 113b.

The optical sensors Ps1 and Ps2 may include, for example, a photodiode and/or a phototransistor. For example, polysilicon, amorphous silicon, and/or the like may be used as a material of the optical sensors Ps1 and Ps2.

One terminal of the first optical sensor Ps1 is connected to the gate terminal of the light emission control transistor M3, and the other terminal of the first optical sensor Ps1 is connected to the reference voltage GND (e.g., a source of the reference voltage GND). The first optical sensor Ps1 is configured to receive a part of light from the organic light-emitting diode OL that is irradiated on the first optical sensor Ps1.

One terminal of the second optical sensor Ps2 is connected to the gate terminal of the light emission control transistor M5, and the other terminal of the second optical sensor Ps2 is connected to the reference voltage GND. The second optical sensor Ps2 is configured to receive a part of light from the organic light-emitting diode OL that is irradiated on the second optical sensor Ps2.

One terminal of a first sensor capacitor Cs1 is connected to the gate terminal of the first light emission control transistor M3, and the other terminal of the first sensor capacitor Cs1 is connected to the reference voltage GND. The first sensor capacitor Cs1 maintains or substantially maintains a potential Vg3 of the gate terminal of the first light emission control transistor M3. The first sensor capacitor Cs1 corresponds to an example of a "first capacitor."

One terminal of a second sensor capacitor Cs2 is connected to the gate terminal of the second light emission control transistor M5, and the other terminal of the second sensor capacitor Cs2 is connected to the reference voltage GND. The second sensor capacitor Cs2 maintains or substantially maintains a potential Vg5 of the gate terminal of the second light emission control transistor M5. The second sensor capacitor Cs2 corresponds to an example of a "second capacitor."

As described above, the pixel circuit 110 according to the second embodiment of the inventive concept includes, as a control circuit for compensating for luminance deterioration, a system including the first optical sensor Ps1, the first sensor capacitor Cs1, the first light emission control transistor M3, and the first switching transistor M4, and a system including the second optical sensor Ps2, the second sensor capacitor Cs2, the second light emission control transistor M5, and the second switching transistor M6. That is, the pixel circuit 110 includes a dual system as the control circuit for compensating for luminance deterioration. Operation of each system is the same or substantially the same as that of the control circuit of the pixel circuit 110 (see FIG. 2) according to the first embodiment of the inventive concept, which includes the optical sensor Ps, the sensor capacitor Cs, the light emission control transistor M3, and the switching transistor M4.

Once the first switching transistor M4 is turned on, the initial sensor voltage Vso (Vso<0) that is pre-adjusted to a potential (e.g., a predetermined potential) is applied from the data driver 130 to the gate terminal of the light emission control transistor M3 through the compensation voltage signal line 115. As described above with respect to the first embodiment of the inventive concept, the initial sensor voltage Vso may be set at a sufficiently low voltage so that the light emission control transistor M3 is operated in a linear region.

Accordingly, the first light emission control transistor M3 is turned on, and the driving transistor M2 is selectively turned on according to the DT signal transferred from the data line 114 and maintained or substantially maintained in the retention capacitor C1. Furthermore, the driving current Ic based on the DT signal maintained or substantially maintained in the retention capacitor C1 is supplied to the organic light-emitting diode OL through the first light emission control transistor M3. A light emission state of the organic light-emitting diode OL is controlled by the driving current Ic based on the DT signal.

Thereafter, once the first switching transistor M4 is turned off, the gate terminal of the first light emission control transistor M3 is floated. Accordingly, the initial sensor voltage Vso applied through the compensation voltage signal line 115 is maintained or substantially maintained in the sensor capacitor Cs1. At this time, the first light emission control transistor M3 is turned on, and the current IL that flows between the drain and the source of the first light emission control transistor M3 is equal to or substantially equal to the driving current Ic.

Thereafter, the initial sensor voltage Vso maintained or substantially maintained in the sensor capacitor Cs1 is discharged by a sensing current Is1 based on a detection result of the first optical sensor Ps1. Due to the discharge, the gate voltage Vg3 of the first light emission control transistor M3 becomes higher than the initial sensor voltage Vso. Furthermore, when the gate voltage Vg3 reaches a threshold voltage Vth3 of the first light emission control transistor M3, the first light emission control transistor M3 is turned off, and the current IL becomes equal to or substantially equal to 0 (e.g., the organic light-emitting diode OL is turned off).

Once the second switching transistor M6 is turned on, the initial sensor voltage Vso (Vso<0) that is pre-adjusted to a potential (e.g., a predetermined potential) is applied from the data driver 130 to the gate terminal of the second light emission control transistor M5 through the compensation voltage signal line 115. In this case, the initial sensor voltage Vso may be set at a sufficiently low voltage so that the second light emission control transistor M5 is operated in a linear region.

Accordingly, the second light emission control transistor M5 is turned on, and the driving transistor M2 is selectively turned on according to the DT signal that is transferred from the data line 114 and maintained or substantially maintained in the retention capacitor C1. Furthermore, the driving current Ic based on the DT signal maintained or substantially maintained in the retention capacitor C1 is supplied to the organic light-emitting diode OL through the light emission control transistor M5, and a light emission state of the organic light-emitting diode OL is controlled.

Thereafter, once the second switching transistor M6 is turned off, the gate terminal of the second light emission control transistor M5 is floated. Accordingly, the initial sensor voltage Vso applied through the compensation voltage signal line 115 is maintained or substantially maintained in the second sensor capacitor Cs2. At this time, the second light emission control transistor M5 is turned on, and the current IL that flows between the drain and the source of the second light emission control transistor M5 is equal to or substantially equal to the driving current Ic.

Thereafter, the initial sensor voltage Vso that is maintained or substantially maintained in the second sensor capacitor Cs2 is discharged by a sensing current Is2 based on a detection result of the second optical sensor Ps2. Due to the discharge, the gate voltage Vg5 of the second light emission control transistor M5 becomes higher than the initial sensor voltage Vso. Furthermore, when the gate voltage Vg5 reaches a threshold voltage Vth5 of the light emission control transistor M5, the light emission control transistor M5 is turned off. At this time, the current IL that flows between the drain and the source of the light emission control transistor M5 becomes equal to or substantially equal to 0 (e.g., the organic light-emitting diode OL is turned off).

Here, a time taken for the first light emission control transistor M3 to be turned off after the first switching transistor M4 is turned off is determined according to a relationship between the sensing current Is1 and the first sensor capacitor Cs1. A time taken for the second light emission control transistor M5 to be turned off after the second switching transistor M6 is turned off is determined according to a relationship between the sensing current Is2 and the second sensor capacitor Cs2. In more detail, as the luminance of the organic light-emitting diode OL becomes higher, a current amount of each of the sensing currents Is1 and Is2 increases, and a discharge time of each of the sensor capacitors Cs1 and Cs2 becomes shorter. In other words, as the luminance of the organic light-emitting diode OL becomes lower, the current amount of each of the sensing currents Is1 and Is2 decreases, and the discharge time of each of the sensor capacitors Cs1 and Cs2 becomes longer.

Therefore, in the case where the luminance of the organic light-emitting diode OL decreases due to deterioration thereof, the current amount of each of the sensing currents Is1 and Is2 decreases, and the discharge time of each of the sensor capacitors Cs1 and Cs2 becomes longer. Accordingly, after deterioration of the organic light-emitting diode OL, a period of time during which the light emission control transistors M3 and/or M5 are turned on is longer than before the deterioration. As a result, an effective luminance of the organic light-emitting diode OL increases, and the luminance deterioration of the organic light-emitting diode OL is compensated for.

A time taken for discharging each of the sensor capacitors Cs1 and Cs2 varies with capacitance values thereof. Therefore, elements having different capacitance values may be used as the sensor capacitors Cs1 and Cs2. Accordingly, a characteristic obtained when the luminance deterioration of the organic light-emitting diode OL is able to be changed through control based on discharge of the first sensor capacitor Cs1 and discharge of the second sensor capacitor Cs2.

In the above description, a P-channel transistor is exemplarily used as each of the transistors of the pixel circuit 110 of FIG. 5, but the inventive concept is not limited thereto. For example, an N-channel transistor may be used as each of the transistors of the pixel circuit 110 of FIG. 5. In this case, relationships among signals in terms of potential may be modified, as appropriate, according to the characteristics of each transistor.

An exemplary configuration of a pixel circuit according to the second embodiment of the inventive concept has been described with reference to FIG. 5.

2.2. Driving Timing

Figure 6:
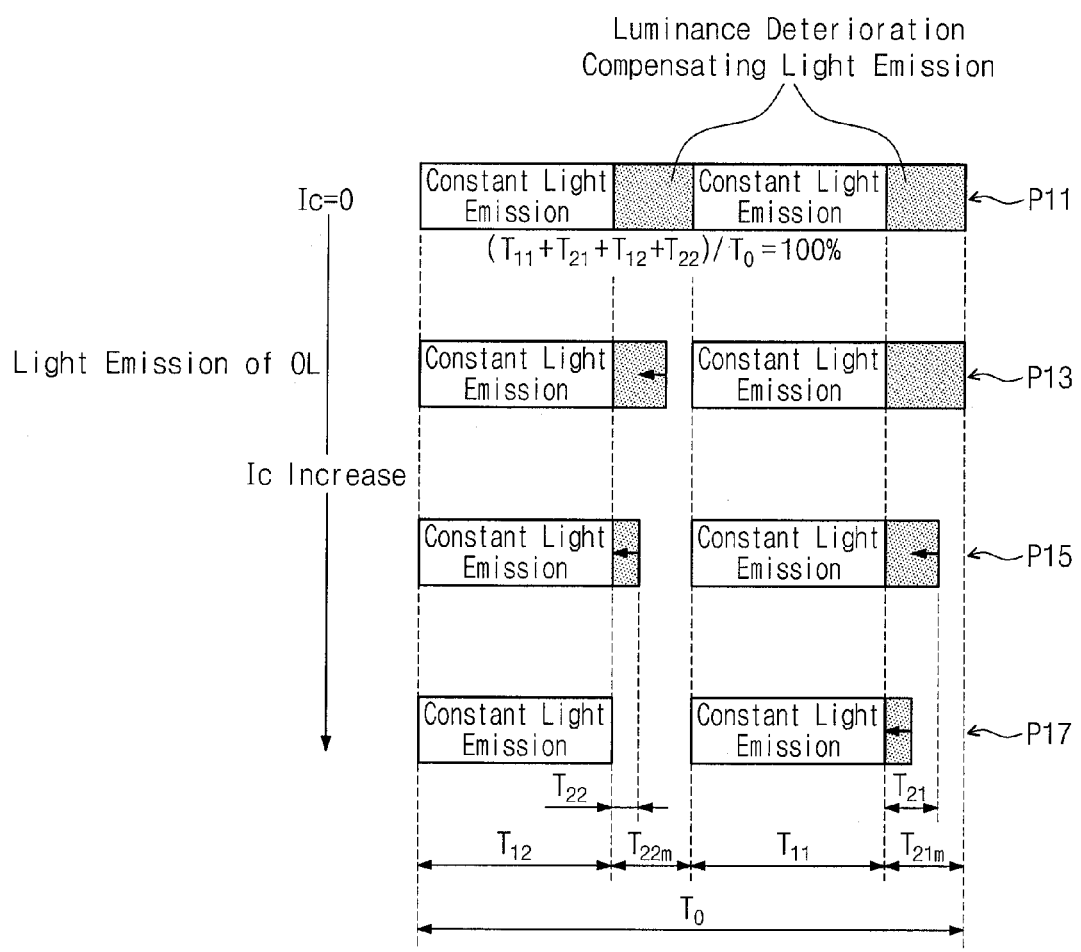
FIG. 6 is a diagram illustrating an exemplary driving timing of a pixel circuit according to the second embodiment of the inventive concept.

An exemplary driving timing of each element of the pixel circuit 110 of FIG. 5 will be described with reference to FIG. 6. FIG. 6 is a diagram illustrating an exemplary driving timing of the pixel circuit 110 according to the second embodiment of the inventive concept. The pixel circuit 110 located at a crossing region of the ith row and the jth column is described below as an example. Since the other pixel circuits 110 have the same or substantially the same structure as that of the exemplary pixel circuit 110, detailed descriptions of the other pixel circuits 110 are not provided.

In FIG. 6, a reference sign $T_0$ represents a light emission interval for displaying an image by operating the organic light-emitting diode OL to emit light during an interval of one frame. For convenience, in the timing chart of FIG. 6, the light emission interval $T_0$ of the organic light-emitting diode OL is shown as the interval of one frame, and other intervals for a control operation may not be shown. Therefore, a control interval and/or the like for compensating for a change in a threshold value of a driving transistor may be provided in addition to the light emission interval $T_0$ during the interval of one frame.

As illustrated in FIG. 6, the light emission interval $T_0$ is divided into constant light emission intervals $T_{11}$ and $T_{12}$, and luminance deterioration compensating light emission intervals $T_{21}$ and $T_{22}$, so that the pixel circuit 110 according to the second embodiment of the inventive concept is controlled according to the intervals. Reference signs $T_{21m}$ and $T_{22m}$ represent maximum values of the luminance deterioration compensating light emission intervals $T_{21}$ and $T_{22}$, respectively. The constant light emission intervals $T_{11}$ and $T_{12}$ represent intervals during which the organic light-emitting diode OL is enabled to constantly emit light on the basis of the driving current Ic. The driving current Ic is determined according to the DT signal based on the luminance of emitted light (or on gradation).

During the luminance deterioration compensating light emission interval $T_{21}$, the amount of the current IL supplied to the organic light-emitting diode OL and an interval during which the current IL is supplied are controlled according to a detection result of the first optical sensor Ps1, so that the luminance deterioration of the organic light-emitting diode OL is compensated for. In more detail, a length of the luminance deterioration compensating light emission interval $1_{21}$ is changed according to a discharge time of the first sensor capacitor Cs1 (in other words, the sensing current Is1 based on a detection result of the first optical sensor Ps1). The length of the luminance deterioration compensating light emission interval $T_{21}$ tends to be shorter as the luminance of the organic light-emitting diode OL is higher (e.g., as the driving current Ic increases).

During the luminance deterioration compensating light emission interval $T_{22}$, the amount of the current IL supplied to the organic light-emitting diode OL and an interval during which the current IL is supplied are controlled according to a detection result of the second optical sensor Ps2, so that the luminance deterioration of the organic light-emitting diode OL is compensated for. That is, a length of the luminance deterioration compensating light emission interval $T_{22}$ is changed according to a discharge time of the second sensor capacitor Cs2 (in other words, the sensing current Is2 based on a detection result of the second optical sensor Ps2). The length of the luminance deterioration compensating light emission interval $T_{22}$ tends to be shorter as the luminance of the organic light-emitting diode OL is higher (e.g., as the driving current Ic increases).

Furthermore, in FIG. 6, reference signs P11, P13, P14, and P17 represent an exemplary relationship between the constant light emission intervals $T_{11}$ and $T_{12}$ and the luminance deterioration compensating light emission intervals $T_{21}$ and $T_{22}$ according to the driving current Ic (e.g., according to the luminance of the organic light-emitting diode OL).

An exemplary driving timing of each element of the pixel circuit 110 according to the second embodiment of the inventive concept will be described with reference to FIGS.

Figure 7:
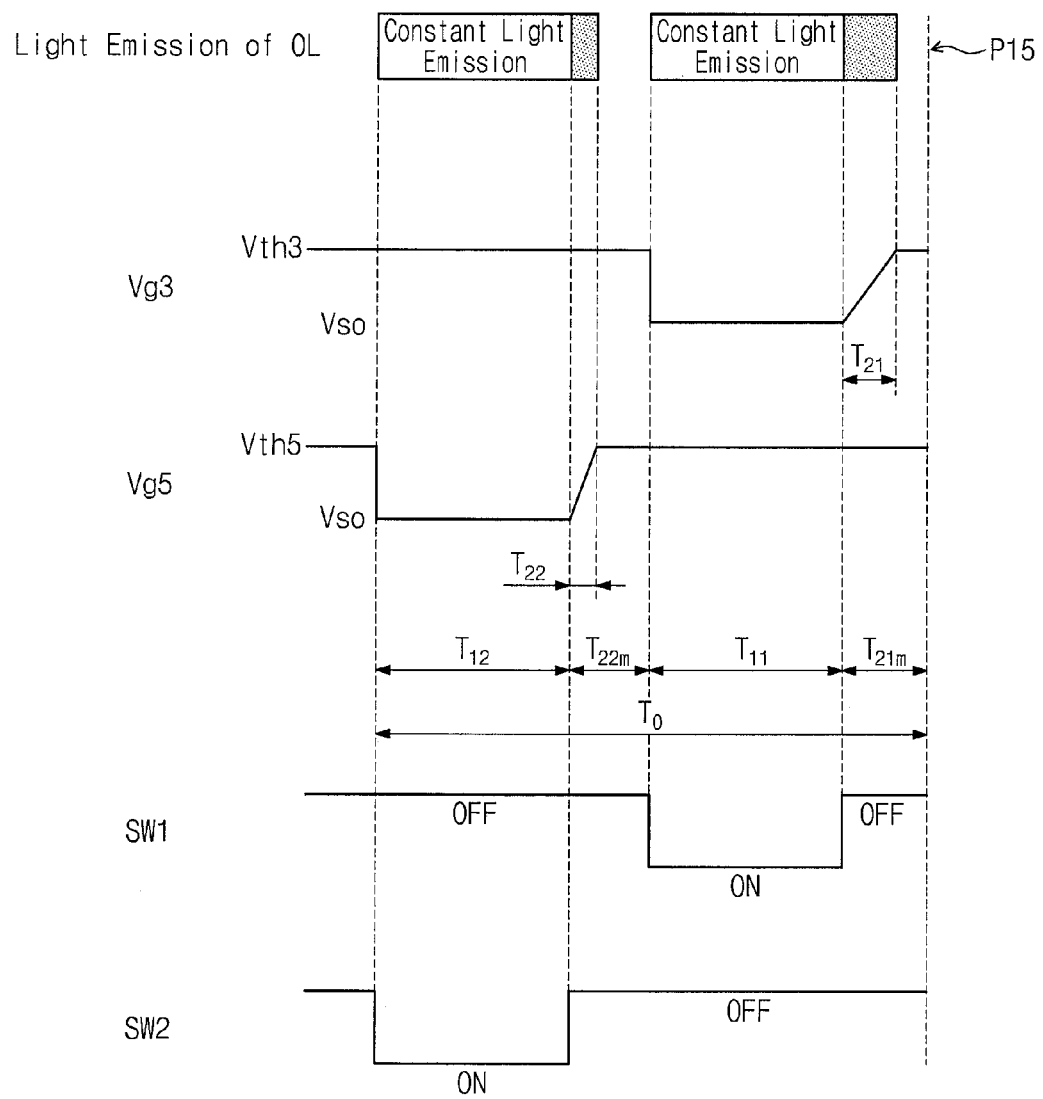
FIG. 7 is a schematic timing chart illustrating an exemplary driving timing of a pixel circuit according to the second embodiment of the inventive concept.

5 to 7. FIG. 7 is a schematic timing chart illustrating an exemplary driving timing of the pixel circuit 110 according to the second embodiment of the inventive concept.

FIG. 7 illustrates an exemplary relationship between the signals SW1 and SW2 and time-series changes in the gate voltages Vg3 and Vg5 of the light emission control transistors M3 and M5 in the case indicated by the reference sign P15 of FIG. 6. The scan signal, the DT signal, and the initial sensor voltage Vso are the same or substantially the same as those of the first embodiment of the inventive concept (see FIG. 3), and thus, are not illustrated in FIG. 7. In FIG. 7, it is assumed that the capacitance value of the first sensor capacitor Cs1 is larger than that of the second sensor capacitor Cs2.

As illustrated in FIG. 7, the signal SW1 is at an L level (e.g., a low level) during an interval $T_{11}$ during the light emission interval $T_0$. That is, the first switching transistor M4 is turned on during the interval $T_{11}$ on the basis of the signal SW1. The signal SW2 is at an L level (e.g., a low level) during an interval $T_{12}$ during the light emission interval $T_0$. That is, the second switching transistor M6 is turned on during the interval $T_{12}$ on the basis of the signal SW2.

In more detail, as illustrated in FIG. 7, the L-level signal SW2 is supplied through the compensation control signal line 113b of the ith row during the interval $T_{12}$, and the second switching transistor M6 of the pixel circuit 110 is turned on. Accordingly, the initial sensor voltage Vso (Vso<0) that is pre-adjusted to a potential (e.g., a predetermined potential) is applied as the gate voltage Vg3 to the gate terminal of the second light emission control transistor M5 of the pixel circuit 110 through the compensation voltage signal line 115 of the jth column.

Therefore, the second light emission control transistor M5 is turned on, and the driving transistor M2 is selectively turned on according to the DT signal (e.g., DTj) that is transferred from the data line 114 and maintained or substantially maintained in the retention capacitor C1. Furthermore, the driving current Ic based on the DT signal maintained or substantially maintained in the retention capacitor C1 is supplied to the organic light-emitting diode OL through the second light emission control transistor M5. Accordingly, the organic light-emitting diode OL emits light with a luminance according to the driving current Ic.

Furthermore, as the L-level signal SW2 is supplied, the second switching transistor M6 is turned on. An interval during which the second light emission control transistor M5 is driven on the basis of the initial sensor voltage Vso (e.g., an interval during which the organic light-emitting diode OL emits light with a luminance according to the driving current Ic) corresponds to the constant light emission interval $T_{12}$.

Thereafter, when the signal SW2 becomes an H-level (e.g., a high level), the second switching transistor M6 is turned off. Furthermore, the initial sensor voltage Vso applied through the compensation voltage signal line 115 is maintained or substantially maintained in the second sensor capacitor Cs2.

Thereafter, the initial sensor voltage Vso maintained or substantially maintained in the second sensor capacitor Cs2 is discharged by the sensing current Is2 based on a detection result of the second optical sensor Ps2. Due to the discharge, the gate voltage Vg5 of the second light emission control transistor M5 becomes higher than the initial sensor voltage Vso. Furthermore, when the gate voltage Vg5 reaches the threshold voltage Vth5 of the second light emission control transistor M5, the light emission control transistor M5 is turned off, and the current IL becomes equal to or substantially equal to 0 (e.g., the organic light-emitting diode OL is turned off).

Due to the discharge of the second sensor capacitor Cs2 by the sensing current Is2, the gate voltage Vg5 starts to increase. A time taken for the gate voltage Vg5 to reach the threshold voltage Vth5 corresponds to the luminance deterioration compensating light emission interval $T_{22}$. As described above, the length of the luminance deterioration compensating light emission interval $T_{22}$ corresponds to the discharge time of the second sensor capacitor Cs2, which is determined according to a relationship between the sensing current Is2 and the second sensor capacitor Cs2.

Thereafter, during the interval $T_{11}$, the L-level signal SW1 is supplied through the compensation control signal line 113a of the ith row, and the first switching transistor M4 of the pixel circuit 110 is turned on. Therefore, the initial sensor voltage Vso (Vso<0) that is pre-adjusted to a potential (e.g., a predetermined potential) is applied as the gate voltage Vg3 to the gate terminal of the first light emission control transistor M3 of the pixel circuit 110 through the compensation voltage signal line 115 of the jth column.

Accordingly, the first light emission control transistor M3 is turned on, and the driving transistor M2 is selectively turned on according to the DT signal maintained or substantially maintained in the retention capacitor C1. Furthermore, the driving current Ic based on the DT signal maintained or substantially maintained in the retention capacitor C1 is supplied to the organic light-emitting diode OL through the light emission control transistor M3. Therefore, the organic light-emitting diode OL emits light with a luminance according to the driving current Ic.

Furthermore, as the L-level signal SW1 is supplied, the first switching transistor M4 is turned on. An interval during which the first light emission control transistor M3 is driven on the basis of the initial sensor voltage Vso (e.g., an interval during which the organic light-emitting diode OL emits light with a luminance according to the driving current Ic) corresponds to the constant light emission interval $T_{11}$.

Thereafter, when the signal SW1 reaches an H level (e.g., a high level), the first switching transistor M4 is turned off, and the initial sensor voltage Vso applied through the compensation voltage signal line 115 is maintained or substantially maintained in the first sensor capacitor Cs1.

Thereafter, the initial sensor voltage Vso maintained or substantially maintained in the first sensor capacitor Cs1 is discharged by the sensing current Is1 based on a detection result of the first optical sensor Ps1. Due to the discharge, the gate voltage Vg3 of the first light emission control transistor M3 becomes higher than the initial sensor voltage Vso. Furthermore, when the gate voltage Vg3 reaches the threshold voltage Vth3 of the first light emission control transistor M3, the first light emission control transistor M3 is turned off, and the current IL becomes equal to or substantially equal to 0 (e.g., the organic light-emitting diode OL is turned off).

Due to the discharge of the first sensor capacitor Cs1 by the sensing current Is1, the gate voltage Vg3 starts to increase. A time taken for the gate voltage Vg3 to reach the threshold voltage Vth3 corresponds to the luminance deterioration compensating light emission interval $T_{21}$. As described above, the length of the luminance deterioration compensating light emission interval $T_{21}$ corresponds to the discharge time of the first sensor capacitor Cs1. The length of the luminance deterioration compensating light emission interval $T_{21}$ is determined according to a relationship between the sensing current Is1 and the first sensor capacitor Cs1.

As described above, in the example of FIG. 7, the pixel circuit 110 is driven with a duty ratio of $(T_{11}+T_{21}+T_{12}+T_{22})/T_0$. As the constant light emission interval $T_{11}$ or $T_{12}$ is longer (e.g., as an interval during which the signal SW1 or SW2 is at an L level is longer), the duty ratio is higher. Therefore, the constant light emission intervals $T_{11}$ and $T_{12}$ may be set to be relatively long so as to prevent or reduce the occurrence of a false contour.

An exemplary driving timing of each element of the pixel circuit 110 of FIG. 5 has been described with reference to FIGS. 6 and 7.

2.3. Principle of Compensation for Luminance Deterioration

A principle of operation of the display apparatus 10 according to the second embodiment of the inventive concept for compensating for the luminance deterioration of the organic light-emitting diode OL will be described with reference to the circuit configuration of the pixel circuit 110 of FIG. 5.

Equations (11) to (13) of the first embodiment of the inventive concept are expressed as Equations (16) to (19b) below.

$$Li = K_1 Ic \left( \frac{T_1}{T_0} + \frac{Cs_1 K_1}{IcT_0} + \frac{Cs_2 K_{22}}{IcT_0} \right) \quad (16)$$

$$Ld = a \cdot K_1 Ic \left( \frac{T_1}{T_0} + \frac{Cs_1 K_{21}}{a \cdot IcT_0} + \frac{Cs_2 K_{22}}{a \cdot IcT_0} \right) \quad (17)$$

$$\frac{Cs_1 K_{21}}{Ic} > T_{21m} \rightarrow \frac{Cs_1 K_{21}}{Ic} = T_{21m} \quad (18a)$$

$$\frac{Cs_1 K_{21}}{a \cdot Ic} > T_{21m} \rightarrow \frac{Cs_1 K_{21}}{a \cdot Ic} = T_{21m} \quad (18b)$$

$$\frac{Cs_{22} K_{22}}{Ic} > T_{22m} \rightarrow \frac{Cs_2 K_{22}}{Ic} = T_{22m} \quad (19a)$$

$$\frac{Cs_2 K_{22}}{a \cdot Ic} > T_{21m} \rightarrow \frac{Cs_2 K_{22}}{a \cdot Ic} = T_{22m} \quad (19b)$$

In Equations (16) to (19b), a coefficient $K_{21}$ represents a constant for determining a relationship between the luminance deterioration ratio "a," the driving current Ic, the first capacitor Cs1, and the luminance deterioration compensating light emission interval $T_{21}$. A coefficient $K_{22}$ represents a constant for determining a relationship between the luminance deterioration ratio "a," the driving current Ic, the second capacitor Cs2, and the luminance deterioration compensating light emission interval $T_{22}$.

For each of the luminance deterioration compensating light emission intervals $T_{21}$ and $T_{22}$, a condition for maximizing a post-deterioration luminance deterioration ratio (e.g., a luminance deterioration compensation ratio) is expressed as Equations (20) and (21) below.

$$\frac{Cs_1 K_{21}}{a \cdot Ic} = T_{21m} \quad (20)$$

$$Cs_1 = \frac{a \cdot IcT_{21m}}{K_{21}}$$

$$\frac{Cs_2 K_{22}}{a \cdot Ic} = T_{22m} \quad (21)$$

$$Cs_2 = \frac{a \cdot IcT_{22m}}{K_{22}}$$

Figure 8:
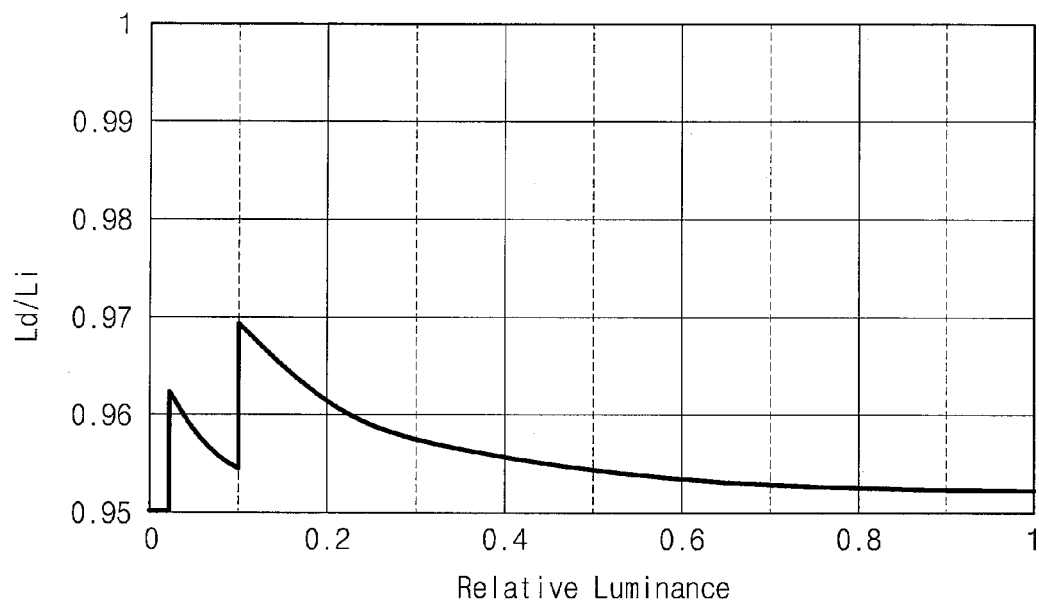
FIG. 8 is a diagram illustrating an exemplary relationship between a relative luminance and a post-compensation luminance deterioration ratio of a display apparatus according to, the second embodiment of the inventive concept.

FIG. 8 illustrates an exemplary relationship between a relative luminance and the post-compensation luminance deterioration ratio Ld/Li of the display apparatus 10 according to the second embodiment of the inventive concept. In FIG. 8, the vertical axis represents the post-compensation luminance deterioration ratio Ld/Li. The horizontal axis represents the relative luminance.

With reference to the example of FIG. 8, it is assumed that the luminance deterioration ratio "a" of the organic light-emitting diode OL is equal to or substantially equal to about 0.95, a ratio of the constant light emission interval $T_{11}$ and/or $T_{12}$ to the light emission interval $T_0$ during one frame is equal to or substantially equal to $T_{11}/T_0=T_{12}/T_0=0.25$, and a ratio of the maximum value $T_{21m}$ and/or $T_{22m}$ of the luminance deterioration compensating light emission interval to the light emission interval $T_0$ is equal to or substantially equal to $T_{21m}/T_0=T_{22m}/T_0=0.25$. FIG. 8 illustrates a relationship between the relative luminance and the post-compensation luminance deterioration ratio Ld/Li in the case where Equation (20) is satisfied at the driving current value Ic at which the relative luminance is equal to or substantially equal to about 10%. Furthermore, FIG. 8 illustrates a relationship between the relative luminance and the post-compensation luminance deterioration ratio Ld/Li in the case where Equation (21) is satisfied at the driving current value Ic at which the relative luminance is equal to or substantially equal to about 3%.

In the example of FIG. 8, the performance of the first optical sensor Ps1 is the same or substantially the same as that of the second optical sensor Ps2, and coefficients $K_{21}$ and $K_{21}$ have a relationship such that $K_{21}=K_{22}$. Furthermore, the capacitance value of the sensor capacitor Cs1 is larger than that of the second capacitor Cs2 (i.e., Cs1>Cs2). The driving current Ic obtained when the relative luminance is about 10% is larger than that obtained when the relative luminance is about 3%.

Referring to FIG. 4, it may be understood that, according to the display apparatus 10 according to the first embodiment of the inventive concept, during the interval during which the relative luminance is less than about 10%, the post-compensation luminance deterioration ratio Ld/Li rapidly decreases as the relative luminance decreases, and immediately converges to the luminance deterioration ratio "a" of 0.95 of the organic light-emitting diode OL. As illustrated in FIG. 8, according to the display apparatus 10 according to the second embodiment of the inventive concept, during the interval during which the relative luminance is less than about 10%, the post-compensation luminance deterioration ratio Ld/Li is maintained or substantially maintained at a higher value than a=0.95 until the relative luminance is less than about 3%.

The display apparatus 10 according to the first embodiment of the inventive concept includes a control circuit for compensating for luminance deterioration having a single system structure. The display apparatus according to the second embodiment of the inventive concept is able to maintain the post-compensation luminance deterioration ratio Ld/Li at a higher value than a=0.95 until the relative luminance decreases to a lower value than that for the display apparatus according to the first embodiment of the inventive concept (e.g., during the interval during which the relative luminance is greater than or equal to about 3%). For example, the pixel circuit 110 may be adjusted so that Equation (14) is satisfied at the driving current value Ic at which the relative luminance is about 3%, so that the post-compensation luminance deterioration ratio Ld/Li may be maintained at a higher value than a=0.95 during the interval during which the relative luminance is less than about 3%.

However, for the display apparatus 10 according to the first embodiment of the inventive concept, if a condition for satisfying Equation (14) is set at a lower luminance side, the post-compensation luminance deterioration ratio Ld/Li tends to become lower at a high luminance side.

Figure 9:
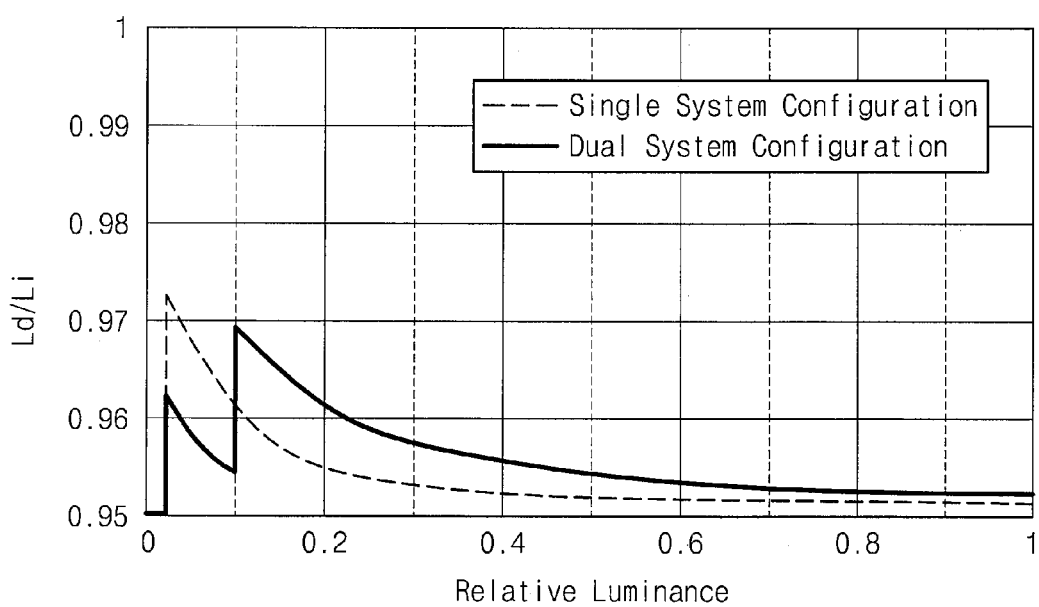
FIG. 9 is a diagram illustrating a result of a comparison between a dual system configuration and a single system configuration with respect to a post-compensation luminance deterioration ratio according to a relative luminance.

FIG. 9 illustrates a result of comparison between the display apparatus 10 according to the first embodiment and the display apparatus 10 according to the second embodiment of the post-compensation luminance deterioration ratio Ld/Li. That is, FIG. 9 adds, as a comparison between FIG. 4 and FIG. 8, a graph of the post-compensation luminance deterioration ratio Ld/Li in the case where a condition for satisfying Equation (14) is set at a lower luminance side for the display apparatus 10 according to the first embodiment of the inventive concept to the graph shown in FIG. 8. In FIG. 9, the graph indicated by "dual system configuration" corresponds to the display apparatus according to the second embodiment of the inventive concept, and the graph indicated by "single system configuration" corresponds to the display apparatus according to the first embodiment of the inventive concept.

Referring to FIG. 9, it may be understood that, in the case of the single system configuration, the post-compensation luminance deterioration ratio Ld/Li may be maintained or substantially maintained at a higher value than a=0.95 over a wider range of the relative luminance by setting a condition for satisfying Equation (14) at a lower luminance side (e.g., lower than at about 10% shown in FIG. 4). However, in the case of the single system configuration, since a condition for satisfying Equation (14) is set at the lower luminance side, the post-compensation luminance deterioration ratio Ld/Li becomes lower at a high luminance side.

Compared to the display apparatus 10 according to the first embodiment of the inventive concept, the display apparatus 10 according to the second embodiment of the inventive concept maintains or substantially maintains the post-compensation luminance deterioration ratio Ld/Li at a higher value than a=0.95 over a wider range of the relative luminance (particularly, at a low luminance side). Furthermore, the display apparatus 10 may maintain or substantially maintain the post-compensation luminance deterioration ratio Ld/Li at a high value even at a high luminance side.

Although it has been described that the pixel circuit 110 is provided with a dual system of a control circuit for compensating for luminance deterioration (e.g., a discharge circuit including optical sensors Ps1 and Ps2 and sensor capacitors Cs1 and Cs2), the inventive concept is not limited thereto. For example, the pixel circuit 110 may include a triple or higher-order system of a control circuit for compensating for luminance deterioration.

A principle of operation of the display apparatus 10 according to the second embodiment of the inventive concept for compensating for the luminance deterioration of the organic light-emitting diode OL has been be described with reference to FIGS. 8 and 9 for the circuit configuration of the pixel circuit 110 of FIG. 5.

2.4. Modification Example

Next, another exemplary driving timing of the pixel circuit 110 will be described as a modification example of the display apparatus 10 according to the second embodiment of the inventive concept.

In the examples of FIGS. 6 and 7, the length of the constant light emission interval $T_{11}$ based on operation of the light emission control transistor M3 is equal to or substantially equal to the length of the constant light emission interval $T_{12}$ based on operation of the light emission control transistor M5. However, according to another example, provided that the lengths of the luminance deterioration compensating light emission intervals $T_{21m}$ and $T_{22m}$ are maintained, a ratio between the lengths of the constant light emission intervals $T_{11}$ and $T_{12}$ may be appropriately modified according to an expected operation type of the display apparatus 10.

Figure 10:
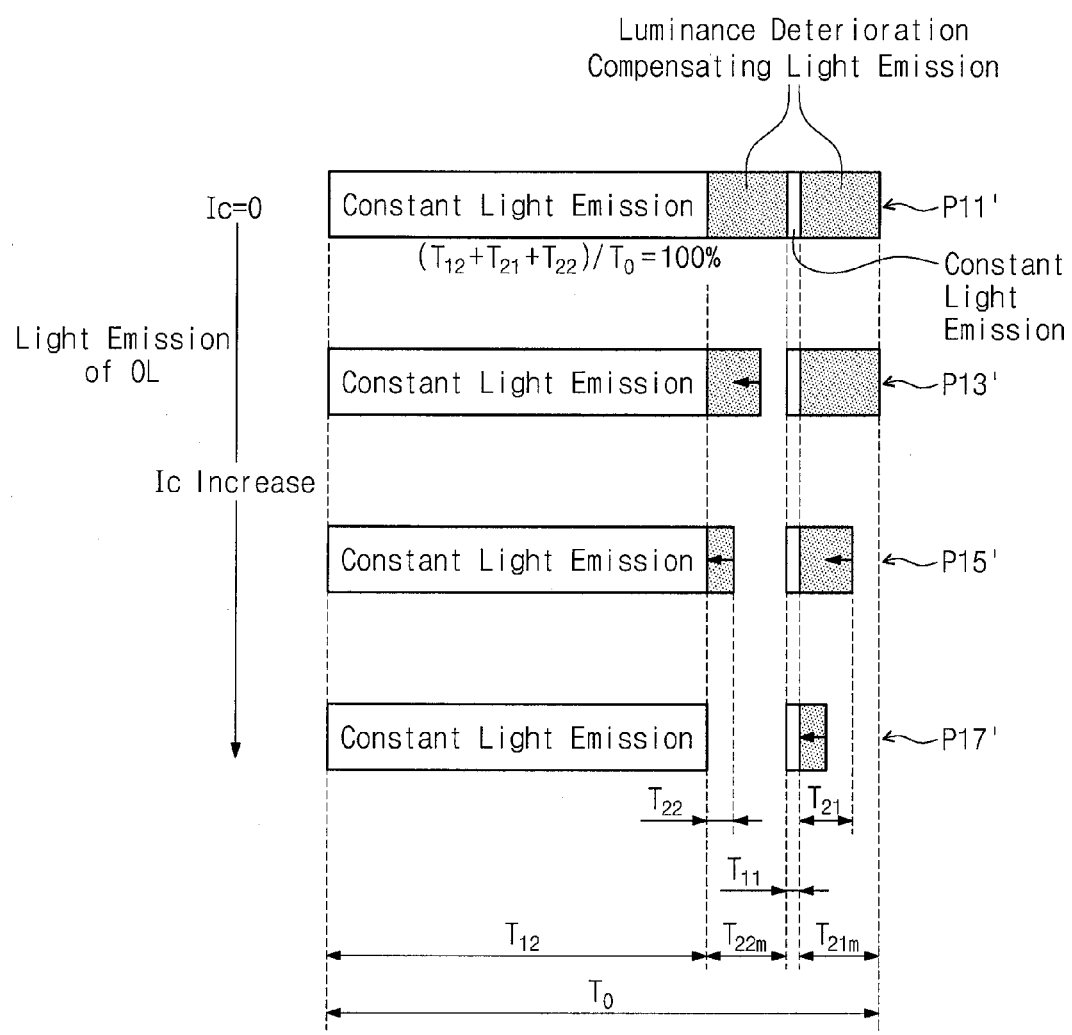
FIG. 10 is a diagram illustrating an exemplary driving timing of a pixel circuit according to another example of the second embodiment of the inventive concept.

For example, FIG. 10 is a diagram illustrating an exemplary driving timing of the pixel circuit 110 according to another example of the second embodiment of the inventive concept. In FIG. 10, the reference signs $P_{11'}$, $P_{13'}$, $P_{15'}$, and $P_{17'}$ correspond to the reference signs $P_{11}$, $P_{13}$, $P_{15}$, and $P_{17}$, respectively, of FIG. 6.

FIG. 10 illustrates an example in which the constant light emission interval $T_{11}$ of FIG. 6 is shortened to a desired minimum length, so as to extend the constant light emission interval $T_{12}$. Here, the desired minimum length of the constant light emission interval $T_{11}$ corresponds to a time for maintaining or substantially maintaining the gate voltage Vg3 of the first light emission control transistor M3 in the first sensor capacitor Cs1, and more specifically, may be equal to about several tens of microsecond.

Figure 11:
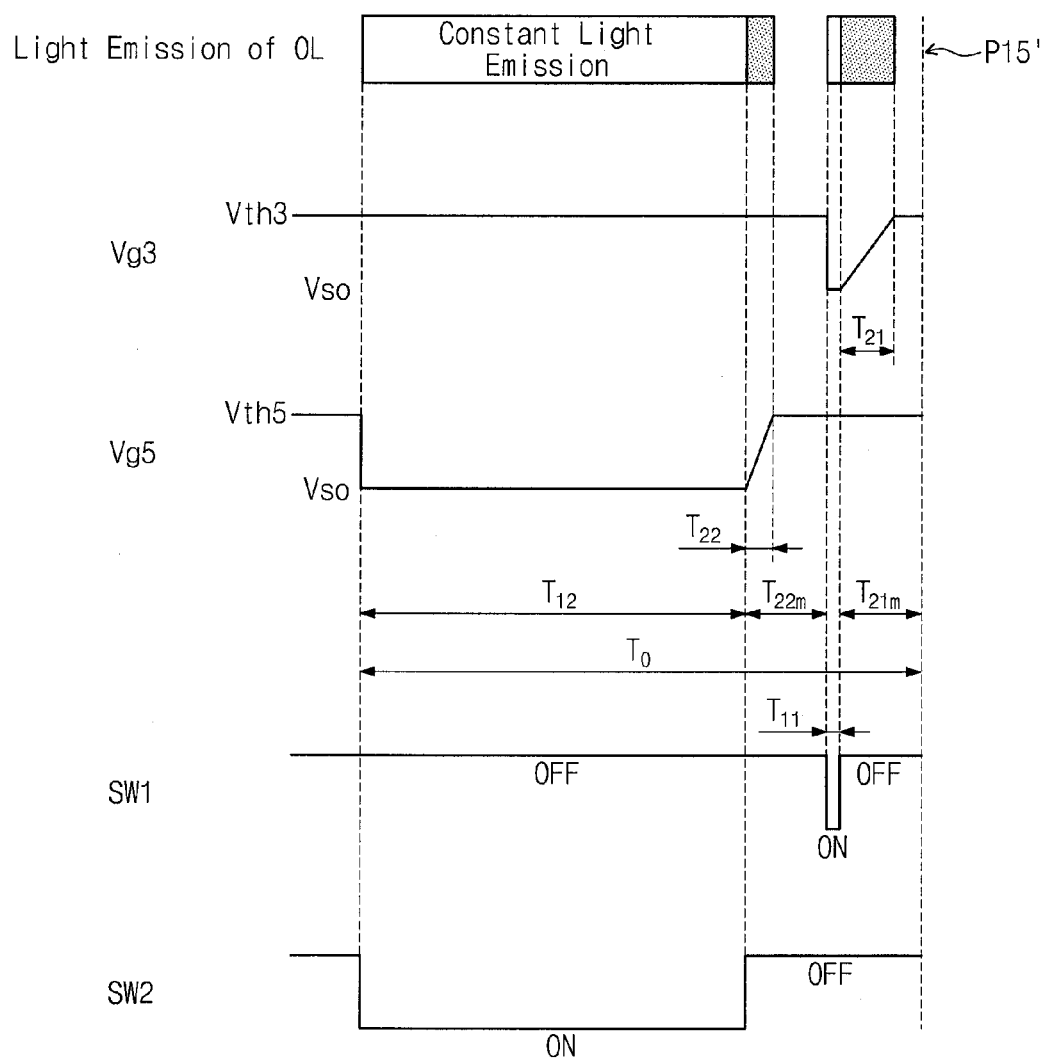
FIG. 11 is a schematic timing chart illustrating an exemplary driving timing of a pixel circuit according to another example of the second embodiment of the inventive concept.

FIG. 11 is a schematic timing chart illustrating an exemplary driving timing of the pixel circuit 110 according to another example of the second embodiment of the inventive concept. FIG. 11 illustrates an exemplary driving timing of the pixel circuit 110 in the case where the pixel circuit 110 according to the second embodiment of the inventive concept illustrated in FIG. 5 is driven so that the length of the constant light emission interval $T_{12}$ is extended as illustrated in FIG. 10. FIG. 11 illustrates a relationship between the signals SW1 and SW2 and time-series changes in the gate voltages Vg3 and Vg5 of the light emission control transistors M3 and M5 in the case indicated by the reference sign $P_{15'}$ of FIG. 10.

As described above, the constant light emission interval $T_{11}$ corresponds to an interval during which the first switching transistor M4 is controlled to be turned on (e.g., an interval during which the signal SW1 is at an L level (e.g., a low level)). The constant light emission interval $T_{12}$ corresponds to an interval during which the second switching transistor M6 is controlled to be turned on (e.g., an interval during which the signal SW2 is at an L level (e.g., a low level)). Therefore, in the case where the pixel circuit 110 is driven as illustrated in FIGS. 10 and 11, an interval during which the signal SW1 is at the L level may be shortened to a desired minimum length, and an interval during which the signal SW2 is at the L level may be extended by as much as the amount of the interval of the signal SW1 at the L level is shortened.

Furthermore, in the examples of FIGS. 10 and 11, in the case where the length of the constant light emission interval $T_{11}$ is approximately (about) equal to 0, the pixel circuit 110 according to another example may be driven with a duty ratio of $(T_{21}+T_{12}+T_{22})/T_0$.

Another exemplary driving timing of the pixel circuit 110 has been described with reference to FIGS. 10 and 11 as another example of the display apparatus 10 according to the second embodiment of the inventive concept.

2.5. Summary

As described above, the display apparatus 10 according to the second embodiment of the inventive concept includes a multisystem of a control circuit for compensating for luminance deterioration. The display apparatus 10 allows the light emission interval $T_0$ of one frame to be divided into a constant light emission interval and a luminance deterioration compensating light emission interval, so that the display apparatus 10 is controlled according to the intervals for each system. The display apparatus 10 controls the luminance of the organic light-emitting diode OL according to the luminance of emitted light (or on gradation) during the constant light emission interval. Furthermore, the display apparatus 10 controls the length of a corresponding luminance deterioration compensating light emission interval for each control circuit for compensating for luminance deterioration. Accordingly, the display apparatus 10 compensates for the amount of light emitted from the organic light-emitting diode OL according to the amount of luminance deterioration of the organic light-emitting diode OL (e.g., compensates for the luminance deterioration).

Accordingly, like the display apparatus 10 according to the first embodiment of the inventive concept, the display apparatus 10 according to the second embodiment of the inventive concept is able to individually control the compensation for the luminance deterioration of the organic light-emitting diode OL and the luminance of the organic light-emitting diode OL according to the luminance of emitted light (or on gradation). That is, according to the display apparatus 10 according to the second embodiment of the inventive concept, the luminance of the organic light-emitting diode OL may be set, and a light emission amount may be compensated according to the amount of luminance deterioration of the organic light-emitting diode OL.

Furthermore, according to the display apparatus 10 according to the second embodiment of the inventive concept, the lengths of the constant light emission intervals $T_{11}$ and $T_{12}$ may be appropriately changed. Therefore, according to the display apparatus 10 according to the second embodiment of the inventive concept, the lengths of the constant light emission intervals $T_{11}$ and $T_{12}$ may be appropriately set according to an operation type of the display apparatus 10, so that the occurrence of a false contour may be avoided.

Moreover, according to the display apparatus 10 according to the second embodiment of the inventive concept, design parameters of the optical sensors Ps1 and Ps2 (e.g., a sensor size, an amount of light irradiated to a sensor, capacitance values of the sensor capacitors Cs1 and Cs2, and/or the like) may be appropriately chosen (e.g., determined) according to sensitivity characteristics of the optical sensors Ps1 and Ps2, so as to appropriately adjust the luminance deterioration compensating light emission intervals $T_{21}$ and $T_{22}$ according to a target luminance deterioration ratio "a." That is, according to the display apparatus 10 according to the second embodiment of the inventive concept, the luminance deterioration compensating light emission intervals $T_{21}$ and $T_{22}$ may be appropriately set according to an operation type (kind) of the display apparatus 10.

In addition, according to the display apparatus 10 according to the second embodiment of the inventive concept, the post-compensation luminance deterioration ratio Ld/Li obtained after performing compensation over a wider luminance range (particularly, a low luminance side) may be maintained or substantially maintained at a higher value than the set or predetermined luminance deterioration ratio "a," and the post-compensation luminance deterioration ratio Ld/Li of a high luminance side may be maintained or substantially maintained at a higher value.

3. Third Embodiment

A display apparatus according to a third embodiment of the inventive concept will be described. The display apparatus according to the third embodiment of the inventive concept is different from the display apparatus according to the above-described embodiments of the inventive concept with respect to the configuration and/or the driving timing of the pixel circuit 110. Therefore, the configuration and/or the driving timing of the pixel circuit 110 of the display apparatus according to the third embodiment of the inventive concept will be particularly described in more detail, and detailed descriptions of the same or substantially the same elements are not repeated.

3.1. Configuration of Pixel Circuit

Figure 12:
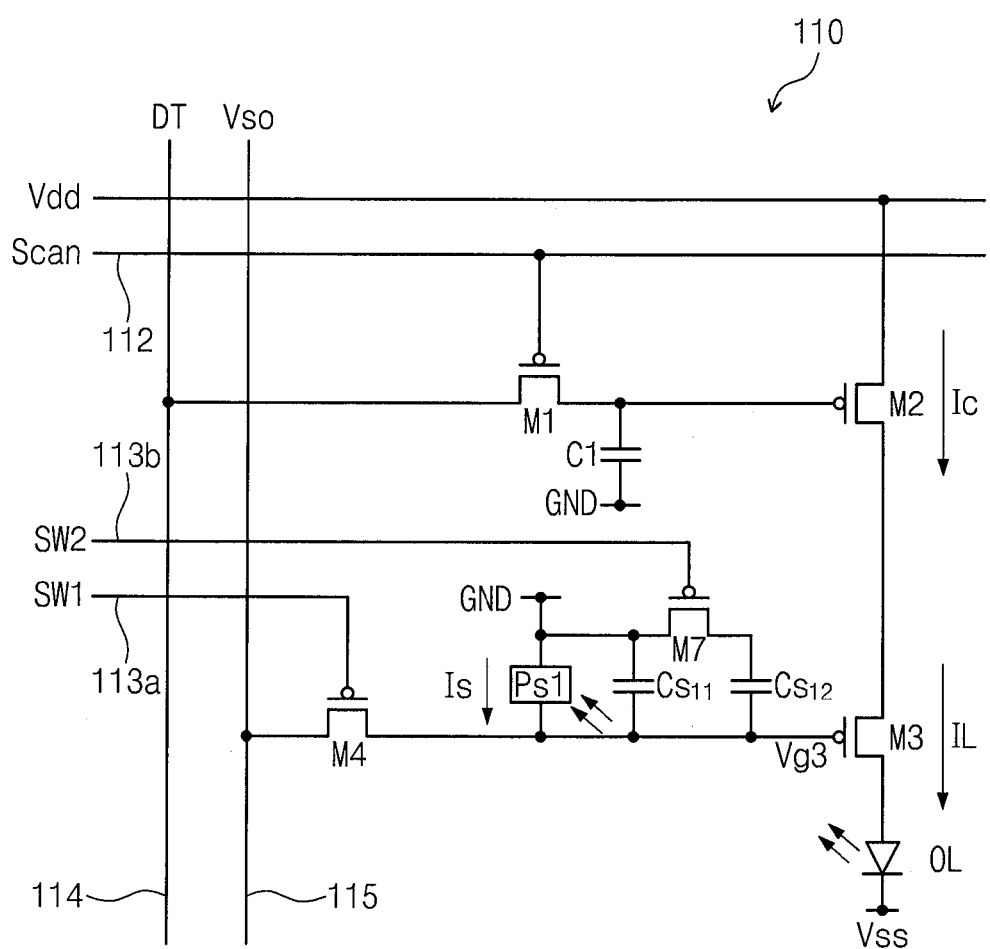
FIG. 12 is a diagram illustrating an exemplary configuration of a pixel circuit according to a third embodiment of the inventive concept.

An exemplary configuration of a pixel circuit according to the third embodiment of the inventive concept will described with reference to FIG. 12. FIG. 12 is a diagram illustrating an exemplary configuration of a pixel circuit according to the third embodiment of the inventive concept.

FIG. 12 illustrates an example of the pixel circuit 110 located at a crossing region of the ith row and the jth column from among the pixel circuits 110 included in the display unit 100 illustrated in FIG. 1. Since the other pixel circuits 110 may have the same or substantially the same structure as that of the pixel circuit 110 of FIG. 12, detailed descriptions of the other pixel circuits 110 are not provided.

As illustrated in FIG. 12, the pixel circuit 110 according to the third embodiment of the invention concept includes an organic light-emitting diode OL, a retention capacitor C1, a switching transistor M1, a driving transistor M2, an optical sensor Ps1, sensor capacitors $Cs_{11}$ and $Cs_{12}$, a light emission control transistor M3, and switching transistors M4 and M7.

The driving transistor M2 and the light emission control transistor M3 may include, for example, P-channel MOSFETs.

The source terminal of the driving transistor M2 is connected to a signal line for supplying the first power supply voltage Vdd, and the drain terminal of the driving transistor M2 is connected to the source terminal of the light emission control transistor M3. The drain terminal of the light emission control transistor M3 is connected to the anode of the organic light-emitting diode OL. The cathode of the organic light-emitting diode OL is connected to the second power supply voltage Vss (e.g., a source of the second power supply voltage Vss).

The driving transistor M2, the retention capacitor C1, and the switching transistor M1 respectively correspond to the driving transistor M2, the retention capacitor C1, and the switching transistor M1 of the pixel circuit 110 according to the first embodiment of the inventive concept (see FIG. 2). Since a connection relationship among the driving transistor M2, the retention capacitor C1, and the switching transistor M1 is the same or substantially the same as that of the pixel circuit 110 according to the first embodiment of the inventive concept, a detailed description of the connection relation is not repeated.

In the display apparatus 10 according to the third embodiment of the inventive concept, signals SW1 and SW2 that correspond to the signal SW of the first embodiment of the inventive concept may be individually supplied to the pixel circuit 110. A compensation control signal line 113a of FIG. 12 is a signal line for supplying the signal SW1 to the pixel circuit 110. A compensation control signal line 113b is a signal line for supplying the signal SW2 to the pixel circuit 110. Furthermore, like the signal SW of the first embodiment of the inventive concept, the signals SW1 and SW2 may be supplied to each pixel circuit 110 by the scan driver 120.

The source terminal of the first switching transistor M4 is connected to the compensation voltage signal line 115, and the drain terminal of the first switching transistor M4 is connected to the gate terminal of the light emission control transistor M3. The first switching transistor M4 is turned on/off by the signal SW1 transferred to the gate terminal of the switching transistor M4 through the compensation control signal line 113a.

The optical sensor Ps1 may include, for example, a photodiode or a phototransistor. For example, polysilicon, amorphous silicon, and/or the like may be used as a material of the optical sensor Ps1. One terminal of the optical sensor Ps1 is connected to the gate terminal of the light emission control transistor M3, and the other terminal of the optical sensor Ps1 is connected to the reference voltage GND (e.g., a source of the reference voltage GND). The optical sensor Ps1 may receive a part of light from the organic light-emitting diode OL that is irradiated on the optical sensor Ps1.

One terminal of the first sensor capacitor $Cs_{11}$ is connected to the gate terminal of the light emission control transistor M3, and the other terminal of the first sensor capacitor $Cs_{11}$ is connected to the reference voltage GND. One terminal of the second sensor capacitor $Cs_{12}$ is connected to the gate terminal of the light emission control transistor M3, and the other terminal of the second sensor capacitor $Cs_{12}$ is connected to the reference voltage GND via the second switching transistor M7. The second switching transistor M7 is turned on/off by the signal SW2 transferred to the gate terminal of the second switching transistor M7 through the compensation control signal line 113b.

That is, while the switching transistor M7 is turned off, the first sensor capacitor $Cs_{11}$ alone, from among the sensor capacitors $Cs_{11}$ and $Cs_{12}$, is connected between the gate terminal of the light emission control transistor M3 and the reference voltage GND. While the second switching transistor M7 is turned on, the sensor capacitors $Cs_{11}$ and $Cs_{12}$ are connected in parallel between the gate terminal of the light emission control transistor M3 and the reference voltage GND.

While the second switching transistor M7 is turned off, the potential Vg3 of the gate terminal of the light emission control transistor M3 is maintained or substantially maintained in the first sensor capacitor $Cs_{11}$. In the case where the second switching transistor M7 is turned on, the potential Vg3 of the gate terminal of the light emission control transistor M3 is maintained or substantially maintained in the sensor capacitors $Cs_{11}$ and $Cs_{12}$.

That is, once the first switching transistor M4 is turned on, the initial sensor voltage Vso (Vso<0) that is pre-adjusted to a potential (e.g., a predetermined potential) is applied from the data driver 130 to the gate terminal of the light emission control transistor M3 through the compensation voltage signal line 115.

Accordingly, the light emission control transistor M3 is turned on, and the driving transistor M2 is selectively turned on according to the DT signal transferred from the data line 114 and maintained or substantially maintained in the retention capacitor C1. Furthermore, the driving current Ic based on the DT signal maintained or substantially maintained in the retention capacitor C1 is supplied to the organic light-emitting diode OL through the light emission control transistor M3, and a light emission state of the organic light-emitting diode OL is controlled.

Thereafter, once the first switching transistor M4 is turned off, the gate terminal of the light emission control transistor M3 is floated.

At this time, in the case where the second switching transistor M7 is turned off, the initial sensor voltage Vso applied through the compensation voltage signal line 115 is maintained or substantially maintained in the first sensor capacitor $Cs_{11}$. Furthermore, at this time, the light emission control transistor M3 is turned on, and the current IL that flows between the drain and the source of the light emission control transistor M3 is equal to or substantially equal to the driving current Ic.

Thereafter, the initial sensor voltage Vso maintained or substantially maintained in the first sensor capacitor $Cs_{11}$ is discharged by the sensing current Is based on a detection result of the optical sensor Ps1. Due to the discharge, the gate voltage Vg3 of the light emission control transistor M3 increases from the potential Vso. Furthermore, when the gate voltage Vg3 reaches the threshold voltage Vth3 of the light emission control transistor M3, the light emission control transistor M3 is turned off, and the current IL becomes equal to or substantially equal to 0 (e.g., the organic light-emitting diode OL is turned off).

Furthermore, in the case where the second switching transistor M7 is turned on, the initial sensor voltage Vso applied through the compensation voltage signal line 115 is maintained or substantially maintained in the sensor capacitors $Cs_{11}$ and $Cs_{12}$. Furthermore, at this time, the light emission control transistor M3 is turned on, and the current IL that flows between the drain and the source of the light emission control transistor M3 is equal to or substantially equal to the driving current Ic.

Thereafter, the initial sensor voltage Vso maintained or substantially maintained in the sensor capacitors $Cs_{11}$ and $Cs_{12}$ is discharged by the sensing current Is based on a detection result of the optical sensor Ps1. Due to the discharge, the gate voltage Vg3 of the light emission control transistor M3 increases from the potential Vso. Moreover, at this time, the gate voltage Vg3 is changed with a characteristic different from that of the case where the second switching transistor M7 is turned off. Furthermore, when the gate voltage Vg3 reaches the threshold voltage Vth3 of the light emission control transistor M3, the light emission control transistor M3 is turned off, and the current IL becomes equal to or substantially equal to 0 (e.g., the organic light-emitting diode OL is turned off).

In the above description, a P-channel transistor is exemplarily used as each of the transistors of the pixel circuit 110 of FIG. 12, but the inventive concept is not limited thereto. For example, an N-channel transistor may be used as each of the transistors of the pixel circuit 110 of FIG. 12. In this case, relationships among signals in terms of potential may be modified, as appropriate, according to characteristics of each of the transistors.

An exemplary configuration of a pixel circuit according to the third embodiment of the inventive concept has been described with reference to FIG. 12.

3.2. Driving Timing

Figure 13:
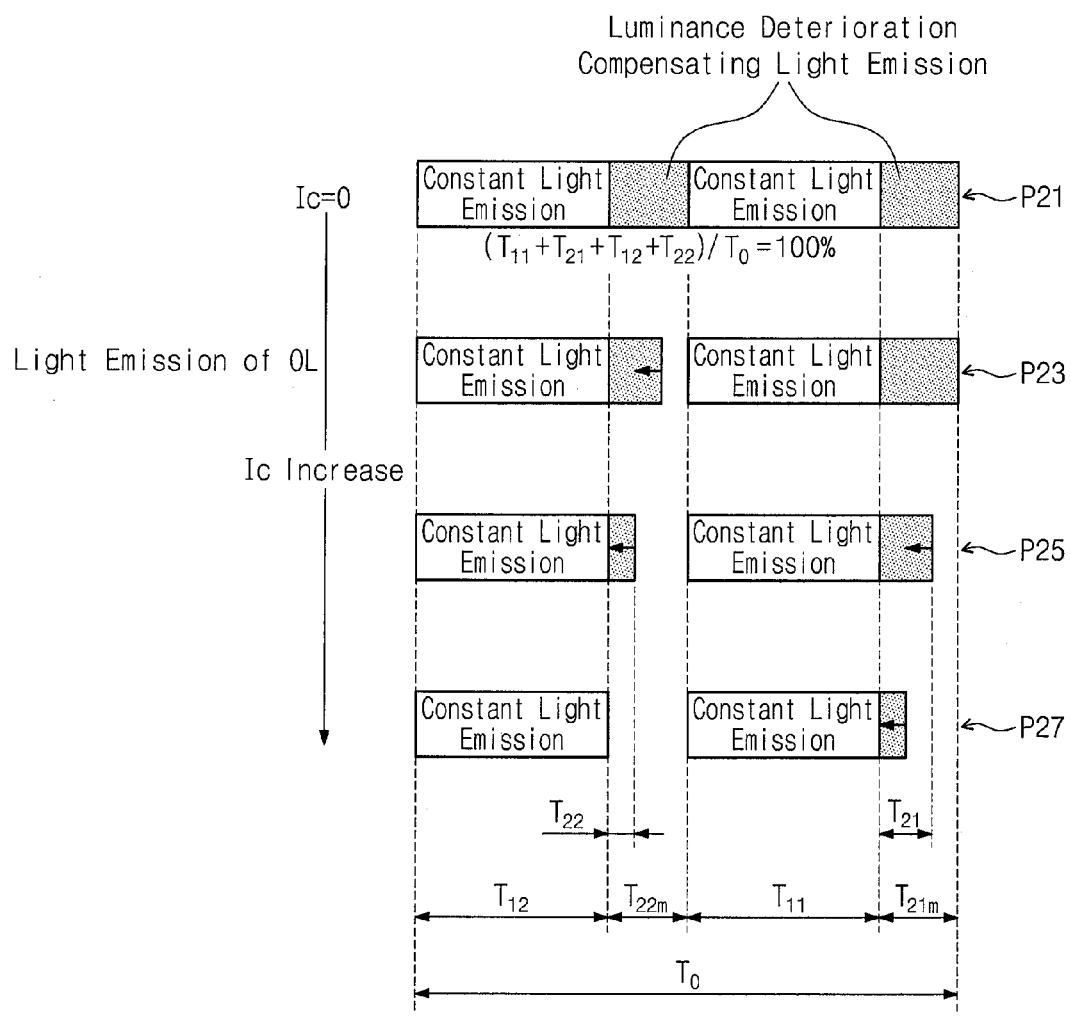
FIG. 13 is a diagram illustrating an exemplary driving timing of a pixel circuit according to the third embodiment of the inventive concept.

An exemplary driving timing of each element of the pixel circuit 110 of FIG. 12 will be described with reference to FIG. 13. FIG. 13 is a diagram illustrating an exemplary driving timing of the pixel circuit 110 according to the third embodiment of the inventive concept. The pixel circuit 110 located at a crossing region of the ith row and the jth column is described below as an example. Since the other pixel circuits 110 have the same or substantially the same structure as that of the exemplary pixel circuit 110, detailed descriptions of the other pixel circuits 110 are not provided.

In FIG. 13, a reference sign $T_0$ represents a light emission interval for displaying an image by operating the organic light-emitting diode OL to emit light during an interval of one frame. For convenience, in the timing chart of FIG. 13, the light emission interval $T_0$ of the organic light-emitting diode OL is shown as the interval of one frame, and other intervals for a control operation are not shown. Therefore, a control interval and/or the like for compensating for a change in a threshold value of a driving transistor may be provided in addition to the light emission interval $T_0$ during the interval of one frame.

As illustrated in FIG. 13, the light emission interval $T_0$ is divided into constant light emission intervals $T_{11}$ and $T_{12}$ and luminance deterioration compensating light emission intervals $T_{21}$ and $T_{22}$, so that the pixel circuit 110 according to the third embodiment of the inventive concept is controlled according to the intervals. Reference signs $T_{21m}$ and $T_{22m}$ represent maximum values of the luminance deterioration compensating light emission intervals $T_{21}$ and $T_{22}$, respectively. The constant light emission intervals $T_{11}$ and $T_{12}$ represent intervals during which the organic light-emitting diode OL is enabled to constantly emit light on the basis of the driving current Ic determined by the DT signal based on the luminance of emitted light (or on gradation).

The first luminance deterioration compensating light emission interval $T_{21}$ corresponds to an interval for compensating for the luminance deterioration of the organic light-emitting diode OL, and the second switching transistor M7 is controlled to be turned on during the first luminance deterioration compensating light emission interval $T_{21}$. That is, the luminance deterioration compensating light emission interval $T_{21}$ is changed on the basis of discharge times of the sensor capacitors $Cs_{11}$ and $Cs_{12}$, and tends to be shorter as the luminance of the organic light-emitting diode OL is higher (e.g., as the driving current Ic increases).

The second luminance deterioration compensating light emission interval $T_{22}$ corresponds to an interval for compensating for the luminance deterioration of the organic light-emitting diode OL, and the second switching transistor M7 is controlled to be turned off during the second luminance deterioration compensating light emission interval $T_{22}$. That is, the second luminance deterioration compensating light emission interval $T_{22}$ is changed on the basis of the discharge time of the first sensor capacitor $Cs_{11}$, and tends to be shorter as the luminance of the organic light-emitting diode OL is higher (e.g., as the driving current Ic increases). In a state where the second switching transistor M7 is turned on, a capacitor in which the initial sensor voltage Vso is maintained or substantially maintained (e.g., a combined capacitor of the sensor capacitors $Cs_{11}$ and $Cs_{12}$) corresponds to an example of a "first capacitor." In a state where the second switching transistor M7 is turned off, a capacitor in which the initial sensor voltage Vso is maintained or substantially maintained (e.g., the sensor capacitor $Cs_{11}$) corresponds to an example of a "second capacitor."

In FIG. 13, reference signs P21, P23, P25, and P27 represent an exemplary relationship between the constant light emission intervals $T_{11}$ and $T_{12}$ and the luminance deterioration compensating light emission intervals $T_{21}$ and $T_{22}$ according to the driving current Ic (e.g., according to the luminance of the organic light-emitting diode OL).

Figure 14:
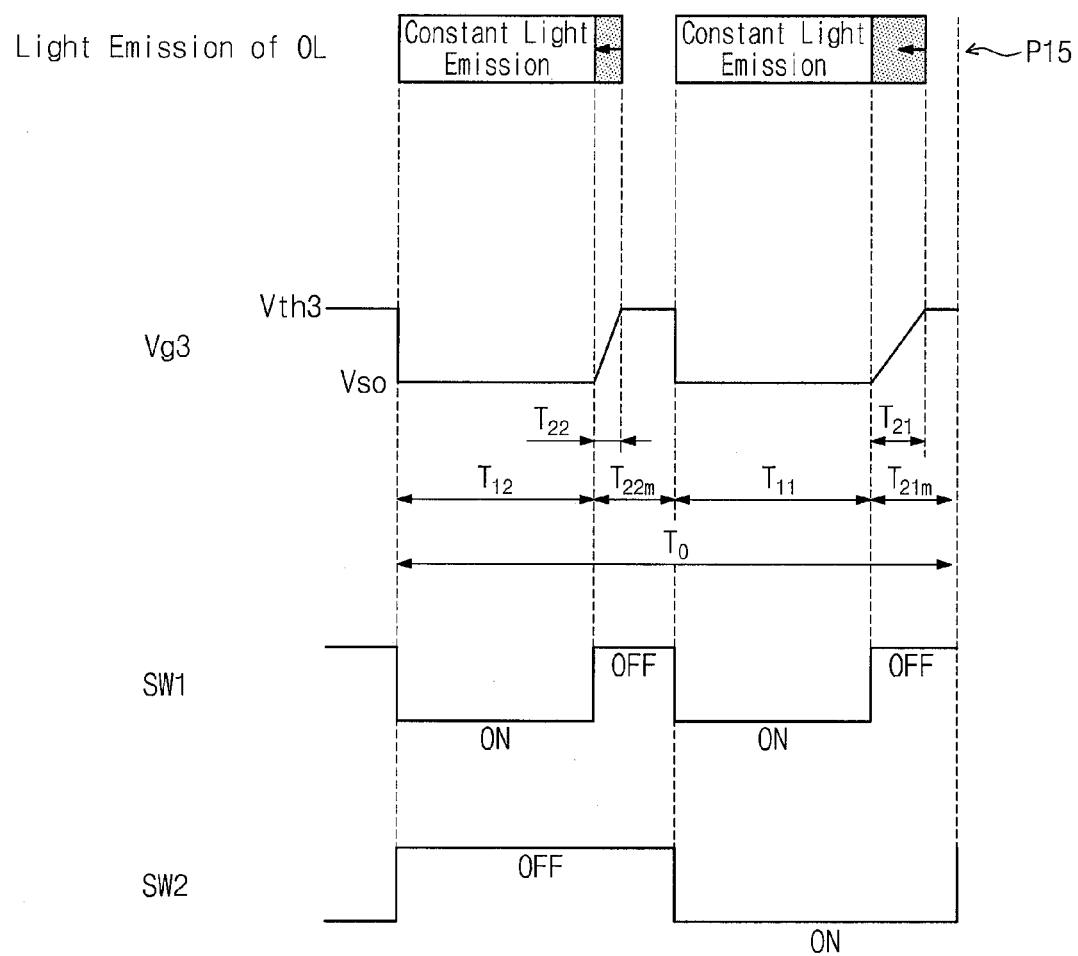
FIG. 14 is a schematic timing chart illustrating an exemplary driving timing of a pixel circuit according to another example of the third embodiment of the inventive concept.

An exemplary driving timing of each element of the pixel circuit 110 according to the third embodiment of the inventive concept will be described with reference to FIGS. 12 to 14. FIG. 14 is a schematic timing chart illustrating an exemplary driving timing of the pixel circuit 110 according to the third embodiment of the inventive concept. FIG. 14 illustrates an exemplary relationship between the signals SW1 and SW2 and time-series changes in the gate voltages Vg3 and Vg5 of the light emission control transistors M3 and M5 in the case indicated by the reference sign P25 of FIG. 13. The scan signal, the DT signal, and the initial sensor voltage Vso are the same or substantially the same as those of the first embodiment of the inventive concept (see FIG. 3), and thus, are not illustrated in FIG. 14.

As illustrated in FIG. 14, the signal SW1 is at an L level (e.g., a low level) during the intervals $T_{11}$ and $T_{12}$ during the light emission interval $T_0$. That is, the first switching transistor M4 is turned on during the intervals $T_{11}$ and $T_{12}$ on the basis of the signal SW1. The signal SW2 is at an L level (e.g., a low level) during the intervals $T_{11}$ and $T_{21m}$ during the light emission interval $T_0$. That is, the second switching transistor M7 is turned on during the intervals $T_{11}$ and $T_{21m}$ on the basis of the signal SW2.

In more detail, as illustrated in FIG. 14, the L-level signal SW1 is supplied through the compensation control signal line 113a of the ith row during the interval $T_{12}$, and the first switching transistor M4 of the pixel circuit 110 is turned on. Therefore, the initial sensor voltage Vso (Vso<0) that is pre-adjusted to a potential (e.g., a predetermined potential) is applied as the gate voltage Vg3 to the gate terminal of the light emission control transistor M3 through the compensation voltage signal line 115 of the jth column.

Accordingly, the light emission control transistor M3 is turned on, and the driving transistor M2 is selectively turned on according to the DT signal (e.g., DTj) transferred from the data line 114 and maintained or substantially maintained in the retention capacitor C1. Furthermore, the driving current Ic based on the DT signal maintained or substantially maintained in the retention capacitor C1 is supplied the organic light-emitting diode OL through the light emission control transistor M3. Accordingly, the organic light-emitting diode OL emits light with a luminance according to the driving current Ic.

Since the signal SW2 is at an H level (e.g., a high level) during the intervals $T_{12}$ and $T_{22m}$, the second switching transistor M7 is turned off. That is, during the intervals $T_{12}$ and $T_{22m}$, the first sensor capacitor $Cs_{11}$ alone, from among the first and second sensor capacitors $Cs_{11}$ and $Cs_{12}$, is connected between the gate terminal of the light emission control transistor M3 of the pixel circuit 110 and the reference voltage GND.

Thereafter, when the signal SW1 reaches an H level (e.g., a high level), the first switching transistor M4 is turned off, and the initial sensor voltage Vso applied through the compensation voltage signal line 115 is maintained or substantially maintained in the first sensor capacitor $Cs_{11}$.

Thereafter, the initial sensor voltage Vso maintained or substantially maintained in the first sensor capacitor $Cs_{11}$ is discharged by the sensing current Is based on a detection result of the optical sensor Ps1. Due to the discharge, the gate voltage Vg3 of the light emission control transistor M3 becomes higher than the initial sensor voltage Vso. Furthermore, when the gate voltage Vg3 reaches the threshold voltage Vth3 of the light emission control transistor M3, the light emission control transistor M3 is turned off, and the current IL becomes equal to or substantially equal to 0 (e.g., the organic light-emitting diode OL is turned off).

Due to the discharge of the first sensor capacitor $Cs_{11}$ by the sensing current Is, the gate voltage Vg3 starts to increase. A time taken for the gate voltage Vg3 to reach the threshold voltage Vth3 corresponds to the second luminance deterioration compensating light emission interval $T_{22}$. The length of the second luminance deterioration compensating light emission interval $T_{22}$ corresponds to the discharge time of the first sensor capacitor $Cs_{11}$, and is determined according to a relationship between the sensing current Is and the first sensor capacitor $Cs_{11}$.

Thereafter, during the interval $T_{11}$, the L-level signal SW1 is supplied through the compensation control signal line 113a of the ith row, and the first switching transistor M4 of the pixel circuit 110 is turned on. Then, the initial sensor voltage Vso (Vso<0) that is pre-adjusted to a potential (e.g., a predetermined potential) is applied as the gate voltage Vg3 to the gate terminal of the light emission control transistor M3 of the pixel circuit 110 through the compensation voltage signal line 115 of the jth column.

Furthermore, during the interval $T_{11}$, the L-level signal SW2 is supplied through the compensation control signal line 113b of the ith row, and the second switching transistor M7 of the pixel circuit 110 is turned on. Accordingly, in the pixel circuit 110, the first and second sensor capacitors $Cs_{11}$ and $Cs_{12}$ connected in parallel are connected between the gate terminal of the light emission control transistor M3 and the reference voltage GND.

Thereafter, when the signal SW1 reaches an H level (e.g., a high level), the first switching transistor M4 is turned off, and the initial sensor voltage Vso applied through the compensation voltage signal line 115 is maintained or substantially maintained in the sensor capacitors $Cs_{11}$ and $Cs_{12}$ (in other words, a combined capacitor including the sensor capacitors $Cs_{11}$ and $Cs_{12}$).

Thereafter, the initial sensor voltage Vso maintained or substantially maintained in the sensor capacitors $Cs_{11}$ and $Cs_{12}$ is discharged by the sensing current Is based on a detection result of the optical sensor Ps1. Due to the discharge, the gate voltage Vg3 of the light emission control transistor M3 increases from the potential Vso. Furthermore, when the gate voltage Vg3 reaches the threshold voltage Vth3 of the light emission control transistor M3, the light emission control transistor M3 is turned off, and the current IL becomes equal to or substantially equal to 0 (e.g., the organic light-emitting diode OL is turned off).

Furthermore, due to the discharge of the sensor capacitors $Cs_{11}$ and $Cs_{12}$ by the sensing current Is, the gate voltage Vg3 starts to increase. A time taken for the gate voltage Vg3 to reach the threshold voltage Vth3 corresponds to the first luminance deterioration compensating light emission interval $T_{21}$. The length of the first luminance deterioration compensating light emission interval $T_{21}$ corresponds to the discharge time of the sensor capacitors $Cs_{11}$ and $Cs_{12}$ (e.g., a combined capacitor including the sensor capacitors $Cs_{11}$ and $Cs_{12}$), and is determined according to a relationship between the sensing current Is and the sensor capacitors $Cs_{11}$ and $Cs_{12}$.

As described above, in the example of FIG. 14, the pixel circuit 110 is driven with a duty ratio of $(T_{11}+T_{21}+T_{12}+T_{22})/T_0$. As the constant light emission intervals $T_{11}$ and $T_{12}$ are longer (e.g., as an interval during which the signal SW1 is at the L level is longer), the duty ratio is higher. Therefore, the constant light emission intervals $T_{11}$ and $T_{12}$ may be set to be relatively long, so as to prevent or reduce the occurrence of a false contour.

An exemplary driving timing of each element of the pixel circuit 110 of FIG. 12 has been described with reference to FIGS. 13 and 14.

Since the display apparatus 10 according to the third embodiment of the inventive concept is the same as the display apparatus 10 according to the second embodiment of the inventive concept with respect to a principle of operation for compensating for the luminance deterioration of the organic light-emitting diode OL, a detailed description of the principle is omitted. The combined capacitor including the sensor capacitors $Cs_{11}$ and $Cs_{12}$ of the display apparatus 10 according to the third embodiment of the inventive concept corresponds to the first sensor capacitor Cs1 of the display apparatus 10 according to the second embodiment of the inventive concept (see FIG. 5). The first sensor capacitor $Cs_{11}$ (e.g., the first sensor capacitor $Cs_{11}$ alone) of the display apparatus 10 according to the third embodiment of the inventive concept corresponds to the second sensor capacitor Cs2 of the display apparatus 10 according to the second embodiment of the inventive concept (see FIG. 5).

Although it has been described that the pixel circuit 110 includes two capacitors $Cs_{11}$ and $Cs_{12}$, the inventive concept is not limited thereto. For example, the pixel circuit 110 according to some embodiments of the inventive concept may include three or more capacitors. In this case, a switching transistor for switching connection relationships among the three or more capacitors may be appropriately arranged in the pixel circuit 110.

3.3. Summary

As described above, according to the display apparatus 10 according to the third embodiment of the inventive concept, a control circuit of the pixel circuit 110 for compensating for luminance deterioration may be switched between the first capacitor (e.g., the combined capacitor including the sensor capacitors $Cs_{11}$ and $Cs_{12}$) and the second capacitor (e.g., the sensor capacitor $Cs_{11}$ alone) by the second switching transistor M7. Accordingly, the display apparatus 10 controls the luminance of the organic light-emitting diode OL according to the luminance of emitted light (or on gradation) during the constant light emission interval. Furthermore, the display apparatus 10 controls the length of a luminance deterioration compensating light emission interval based on discharge of the first capacitor, and controls the length of a luminance deterioration compensating light emission interval based on discharge of the second capacitor, so as to compensate for the amount of light emitted from the organic light-emitting diode OL according to the amount of luminance deterioration of the organic light-emitting diode OL (e.g., compensate for the luminance deterioration).

Thus, like the display apparatus 10 according to the first embodiment of the inventive concept, the display apparatus 10 according to the third embodiment of the inventive concept is able to individually control the compensation for the luminance deterioration of the organic light-emitting diode OL and the luminance of the organic light-emitting diode OL according to the luminance of emitted light (or on gradation). According to the display apparatus 10 according to the third embodiment of the inventive concept, the luminance of the organic light-emitting diode OL may be set, and the light emission amount may be compensated according to the amount of luminance deterioration of the organic light-emitting diode OL.

Furthermore, according to the display apparatus 10 according to the third embodiment of the inventive concept, the lengths of the constant light emission intervals $T_{11}$ and $T_{12}$ may be appropriately changed. Therefore, according to the display apparatus 10 according to the third embodiment of the inventive concept, the lengths of the constant light emission intervals $T_{11}$ and $T_{12}$ may be appropriately set according to an operation type of the display apparatus 10, so that the occurrence of a false contour may be avoided.

Moreover, according to the display apparatus 10 according to the third embodiment of the inventive concept, design parameters of the optical sensor Ps1 (e.g., a sensor size, an amount of light irradiated to a sensor, capacitance values of the sensor capacitors Cs1 and Cs2, and/or the like) may be appropriately chosen (e.g., determined) according to sensitivity characteristics of the optical sensor Ps1, so as to appropriately adjust the luminance deterioration compensating light emission intervals $T_{21}$ and $T_{22}$ according to a target luminance deterioration ratio "a." That is, according to the display apparatus 10 according to the third embodiment of the inventive concept, the luminance deterioration compensating light emission intervals $T_{21}$ and $T_{22}$ may be appropriately set according to an operation type (kind) of the display apparatus 10.

In addition, according to the display apparatus 10 according to the third embodiment of the inventive concept, the post-compensation luminance deterioration ratio Ld/Li obtained after performing compensation over a wider luminance range (particularly, a low luminance side) may be maintained or substantially maintained at a higher value than that of the set or predetermined luminance deterioration ratio "a," and the post-compensation luminance deterioration ratio Ld/Li of a high luminance side may be maintained or substantially maintained at a higher value.

Furthermore, it may be understood from FIGS. 5 and 12 that the display apparatus 10 according to one or more embodiments of the present invention may enable reduction of a scale of the pixel circuit 110 compared to the display apparatus 10 according to the second embodiment of the inventive concept.

As described above, according to one or more embodiments of the inventive concept, the occurrence of a false contour may be prevented or reduced. Furthermore, one or more embodiments of the inventive concept may provide a display apparatus, a display method, and a program for desirably compensating for the amount of light emission of a light-emitting element according to the amount of deterioration of the light-emitting element for each pixel.

Exemplary embodiments have been described herein with reference to the accompanying drawings. The present inventive concept, however, may be embodied in various different forms, and should not be construed as being limited to only the illustrated embodiments herein. Rather, these embodiments are provided as examples so that this disclosure will be thorough and complete, and will fully convey the aspects and features of the inventive concept to those skilled in the art. Accordingly, processes, elements, and techniques that are not necessary to those having ordinary skill in the art for a complete understanding of the aspects and features of the inventive concept may not be described. Unless otherwise noted, like reference numerals denote like elements throughout the attached drawings and the written description, and thus, descriptions thereof may not be repeated.

In the drawings, the relative sizes of elements, layers, and regions may be exaggerated for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the inventive concept.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the inventive concept described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the inventive concept.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The above-disclosed embodiments are to be considered as illustrative and not restrictive, and the appended claims, and their equivalents, are intended to cover any and all modifications, enhancements, and/or other embodiments, which fall within the spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A display apparatus comprising pixel circuits arranged in a matrix, each of the pixel circuits comprising:
    a light-emitting element configured to emit light having a luminance based on an amount of current;
    an optical sensor configured to detect the luminance of the light emitted from the light-emitting element; and
    a compensation control circuit comprising a first capacitor and a second capacitor, the first and second capacitors configured to maintain a second voltage applied to the compensation control circuit,
    wherein a light emission interval of the light-emitting element comprises:
        a first interval having a length during which the light-emitting element is configured to constantly emit light having a luminance based on a first voltage for controlling the luminance of the light-emitting element;
        a second interval; and
        a third interval, and
    wherein the compensation control circuit is configured to:
        control an amount of current supplied to the light-emitting element according to a detection result of the optical sensor and the second voltage maintained in the first capacitor, during the second interval; and
        control an amount of current supplied to the light-emitting element according to a detection result of the optical sensor and the second voltage maintained in the second capacitor, during the third interval.

2. The display apparatus of claim 1,
    wherein the first capacitor is configured to maintain the second voltage applied during the second interval, and
    wherein the second capacitor is configured to maintain the second voltage applied during the third interval.

3. The display apparatus of claim 2, wherein the compensation control circuit comprises a light emission control transistor configured to control an amount of a source-drain current thereof based on the second voltage maintained in at least one of the first capacitor or the second capacitor and a gate voltage determined according to the detection result of the optical sensor.

4. The display apparatus of claim 3,
    wherein the optical sensor comprises a first optical sensor and a second optical sensor,
    wherein the light emission control transistor comprises a first light emission control transistor and a second light emission control transistor,
    wherein one terminal of the first optical sensor and one terminal of the first capacitor are connected to a gate terminal of the first light emission control transistor,
    wherein one terminal of the second optical sensor and one terminal of the second capacitor are connected to a gate terminal of the second light emission control transistor,
    wherein the first light emission control transistor is configured to control an amount of a source-drain current thereof based on the second voltage maintained in the first capacitor and a gate voltage determined according to a detection result of the first optical sensor, during the second interval, and
    wherein the second light emission control transistor is configured to control an amount of a source-drain current thereof based on the second voltage maintained in the second capacitor and a gate voltage determined according to a detection result of the second optical sensor, during the third interval.

5. The display apparatus of claim 3, further comprising a switching element configured to switch between the first capacitor and the second capacitor for maintaining the second voltage,
    wherein the light emission control transistor is configured to control the amount of the source-drain current thereof based on the second voltage maintained in the first capacitor and the gate voltage determined according to a detection result of the optical sensor, during the second interval, and configured to control the amount of the source-drain current thereof based on the second voltage maintained in the second capacitor and the gate voltage determined according to a detection result of the optical sensor, during the third interval.

6. The display apparatus of claim 1,
    wherein the third interval is before the second interval during an interval of one frame, and
    wherein a capacitance of the first capacitor is larger than that of the second capacitor.

7. The display apparatus of claim 1,
    wherein each of the pixel circuits further comprises a driving transistor configured to control an amount of a source-drain current thereof based on the first voltage applied to a gate terminal of the driving transistor, and
    wherein the amount of current supplied to the light-emitting element is controlled based on the driving transistor and the compensation control circuit.

8. The display apparatus of claim 7,
    wherein the driving transistor is located at a front stage of the compensation control circuit, and
    wherein the compensation control circuit is configured to control the amount of current supplied to the light-emitting element based on current supplied through the driving transistor.

9. A method for displaying an image on a display apparatus comprising pixel circuits arranged in a matrix, each of the pixel circuits comprising:
    a light-emitting element configured to emit light having a luminance based on an amount of current;

an optical sensor configured to detect the luminance of the light emitted from the light-emitting element; and a compensation control circuit comprising a first capacitor and a second capacitor, the first and second capacitors configured to maintain a second voltage applied to the compensation control circuit, wherein a light emission interval of the light-emitting element comprises:

a first interval having a length during which the light-emitting element is configured to constantly emit light having a luminance based on a first voltage for controlling the luminance of the light-emitting element;

a second interval; and a third interval, the method comprising:

controlling an amount of current supplied to the light-emitting element based on a detection result of the optical sensor and the second voltage maintained in the first capacitor, during the second interval; and controlling the amount of current supplied to the light-emitting element based on a detection result of the optical sensor and the second voltage maintained in the second capacitor, during the third interval.

10. A recording medium for storing a program comprising instructions for displaying an image on a display apparatus comprising pixel circuits arranged in a matrix, each of the pixel circuits comprising:

a light-emitting element configured to emit light having a luminance based on an amount of current;

an optical sensor configured to detect the luminance of the light emitted from the light-emitting element; and a compensation control circuit comprising a first capacitor and a second capacitor, the first and second capacitors configured to maintain a second voltage applied to the compensation control circuit, wherein a light emission interval of the light-emitting element comprises:

a first interval having a length during which the light-emitting element is configured to constantly emit light having a luminance based on a first voltage for controlling the luminance of the light-emitting element;

a second interval; and a third interval, the instructions of the program cause the compensation control circuit to:

control an amount of current supplied to the light-emitting element based on a detection result of the optical sensor and the second voltage maintained in the first capacitor, during the second interval; and control the amount of current supplied to the light-emitting element based on a detection result of the optical sensor and the second voltage maintained in the second capacitor, during the third interval.

\* \* \* \* \*